(12) United States Patent
Kanno et al.

(10) Patent No.: US 7,802,866 B2
(45) Date of Patent: Sep. 28, 2010

(54) RECORDING HEAD THAT DETECTS TEMPERATURE INFORMATION CORRESPONDING TO A PLURALITY OF ELECTRO-THERMAL TRANSDUCERS ON THE RECORDING HEAD AND RECORDING APPARATUS USING THE RECORDING HEAD

(75) Inventors: Hideo Kanno, Yokohama (JP); Isao Hayashi, Kawasaki (JP); Seiichiro Karita, Toda (JP); Hiroshi Takabayashi, Atsugi (JP); Takatsuna Aoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 11/762,328

(22) Filed: Jun. 13, 2007

(65) Prior Publication Data
US 2007/0291081 A1 Dec. 20, 2007

(30) Foreign Application Priority Data
Jun. 19, 2006 (JP) .............................. 2006-169383

(51) Int. Cl.
B41J 29/393 (2006.01)
B41J 29/38 (2006.01)
B41J 2/05 (2006.01)

(52) U.S. Cl. .............................. 347/19; 347/6; 347/17; 347/60

(58) Field of Classification Search ..................... 347/17
See application file for complete search history.

(56) References Cited

U.S. PATENT DOCUMENTS

| | | | | | |
|---|---|---|---|---|---|
| 4,550,327 A | * | 10/1985 | Miyakawa | ................... | 347/19 |
| 4,875,042 A | * | 10/1989 | Oku et al. | .............. | 340/870.17 |
| 4,947,194 A | * | 8/1990 | Kyoshima | ..................... | 347/14 |
| 5,831,643 A | * | 11/1998 | Chung | .......................... | 347/17 |
| 5,902,044 A | * | 5/1999 | Pricer et al. | .................. | 374/112 |
| 6,382,773 B1 | * | 5/2002 | Chang et al. | ................... | 347/57 |
| 7,563,024 B2 | * | 7/2009 | Rotem et al. | ................. | 374/183 |
| 2002/0027574 A1 | * | 3/2002 | Kao et al. | ....................... | 347/17 |
| 2009/0058914 A1 | * | 3/2009 | Kim et al. | ...................... | 347/17 |

FOREIGN PATENT DOCUMENTS

| | | |
|---|---|---|
| CN | 1343564 A | 4/2002 |
| EP | 0742101 A | 11/1996 |
| JP | 2831778 B | 11/1990 |
| JP | 4-6549 B2 | 2/1992 |

* cited by examiner

*Primary Examiner*—Matthew Luu
*Assistant Examiner*—Shelby Fidler
(74) *Attorney, Agent, or Firm*—Canon U.S.A., Inc. I.P. Division

(57) ABSTRACT

A recording head is provided that detects temperature information corresponding to a plurality of electro-thermal transducers. The recording head includes a driving circuit that performs driving by dividing a plurality of heaters into a plurality of blocks and supplies electric current on a block-by-block basis based on recording data. A constant current source applies a common bias current to each temperature sensor group obtained by dividing temperature sensors disposed in correspondence to each heater of a plurality of heaters into blocks. A voltage output circuit is further included having a switching element turns an electric current supply to the temperature sensors of the selected temperature sensor group ON and OFF, and of which obtains a voltage generated at both terminals of the selected temperature sensor by supplying an electric current to the temperature sensor; and an amplifier circuit amplifying the detection voltages.

15 Claims, 27 Drawing Sheets

F I G. 1
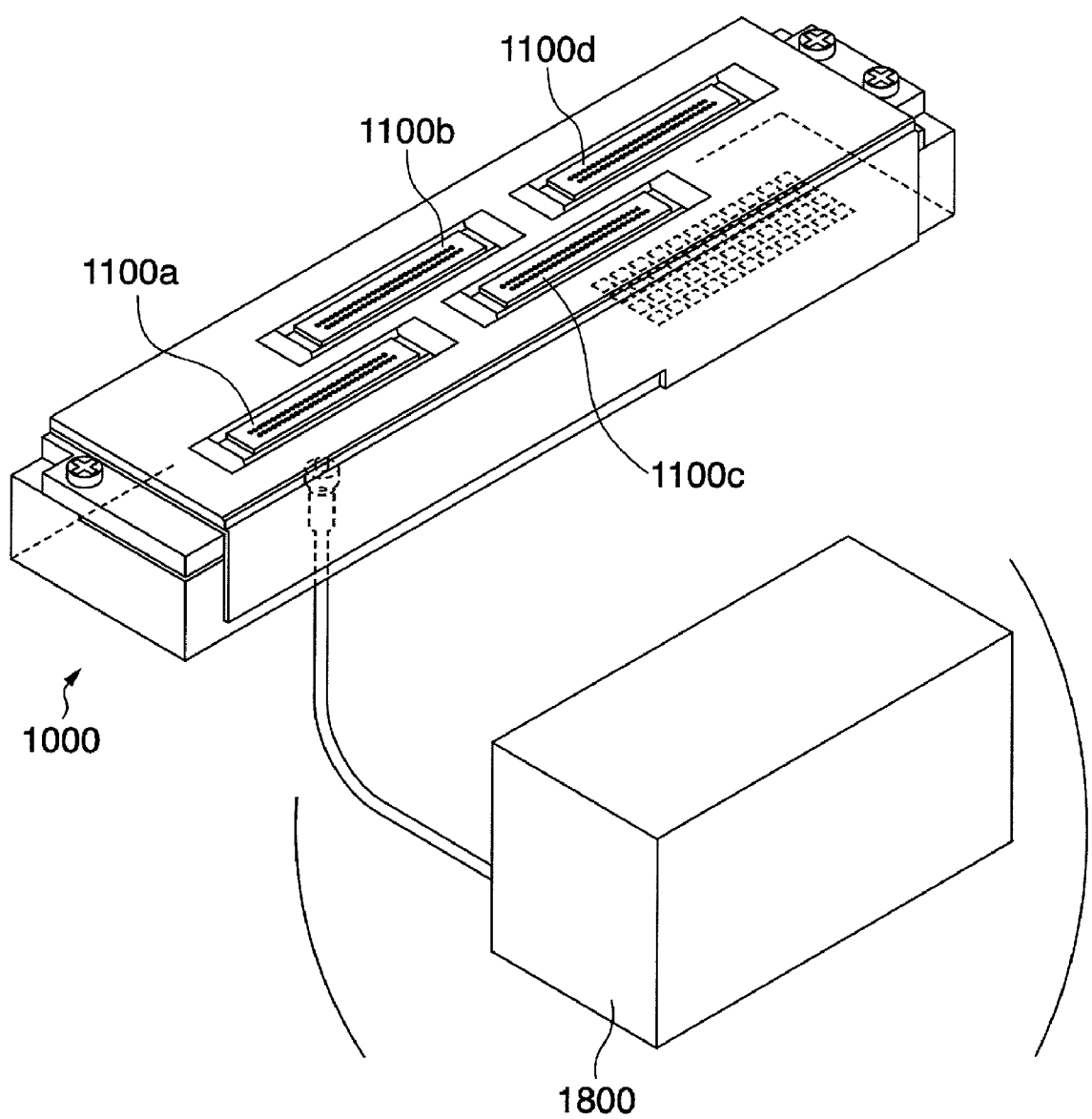

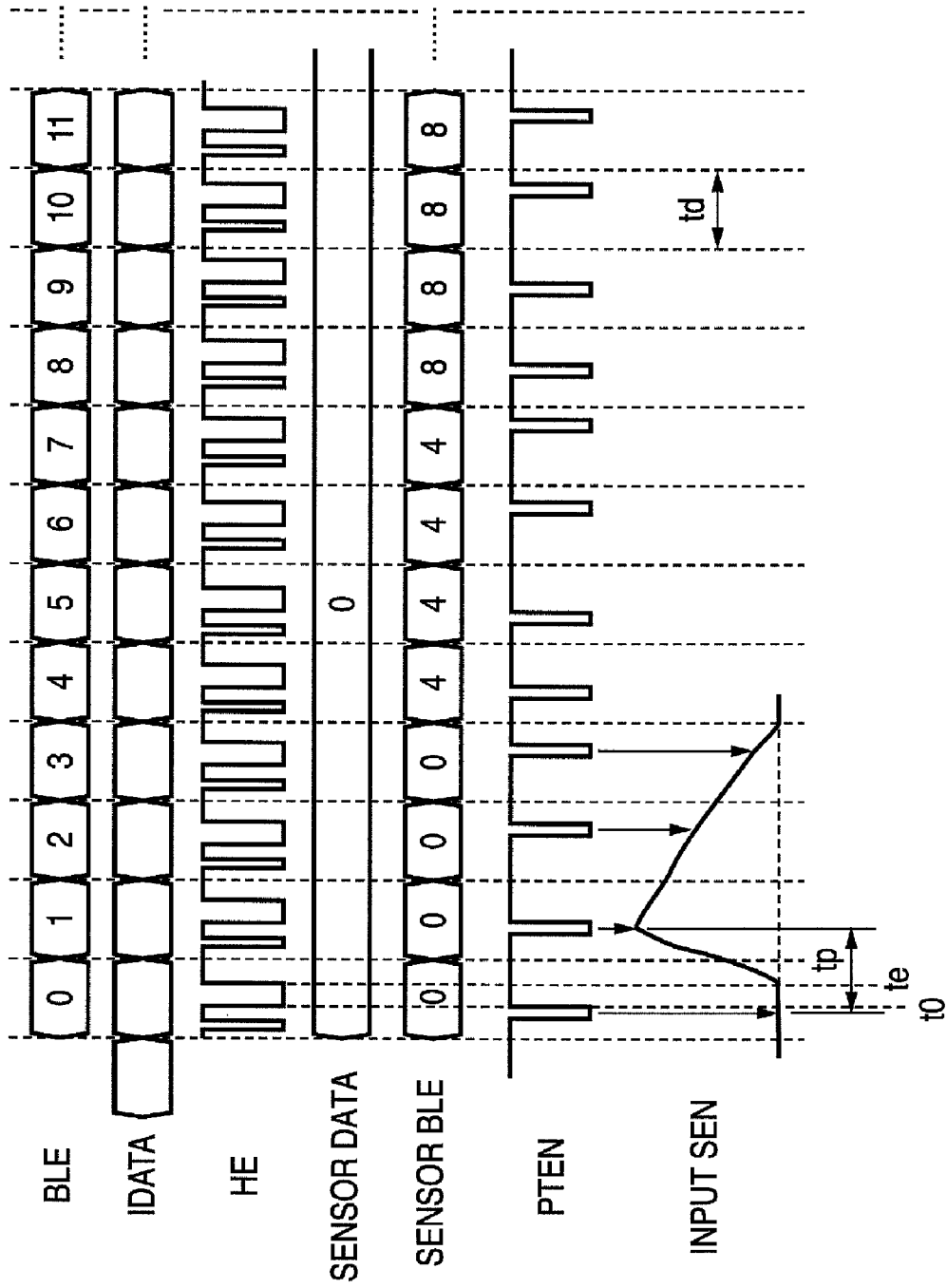

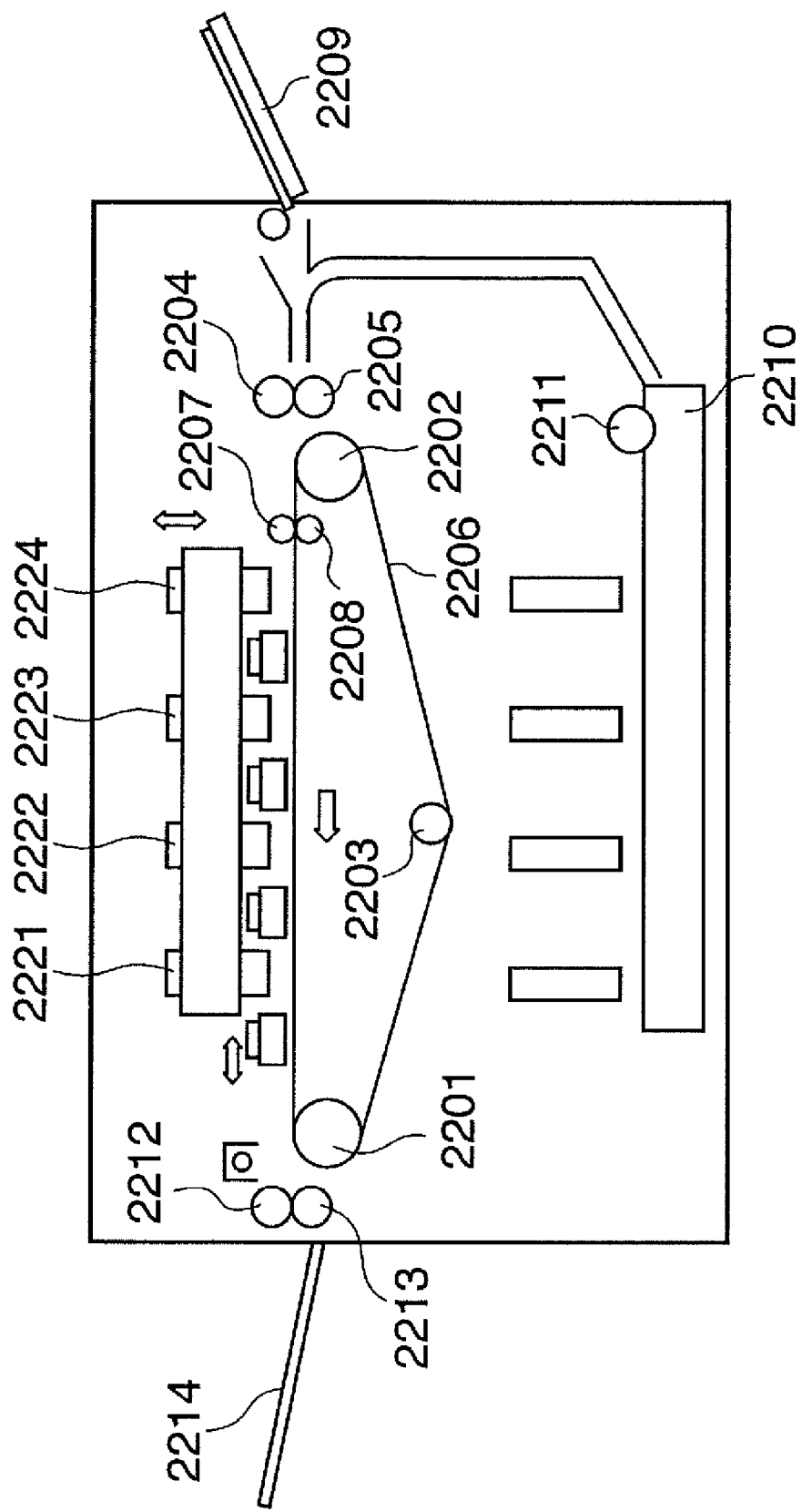

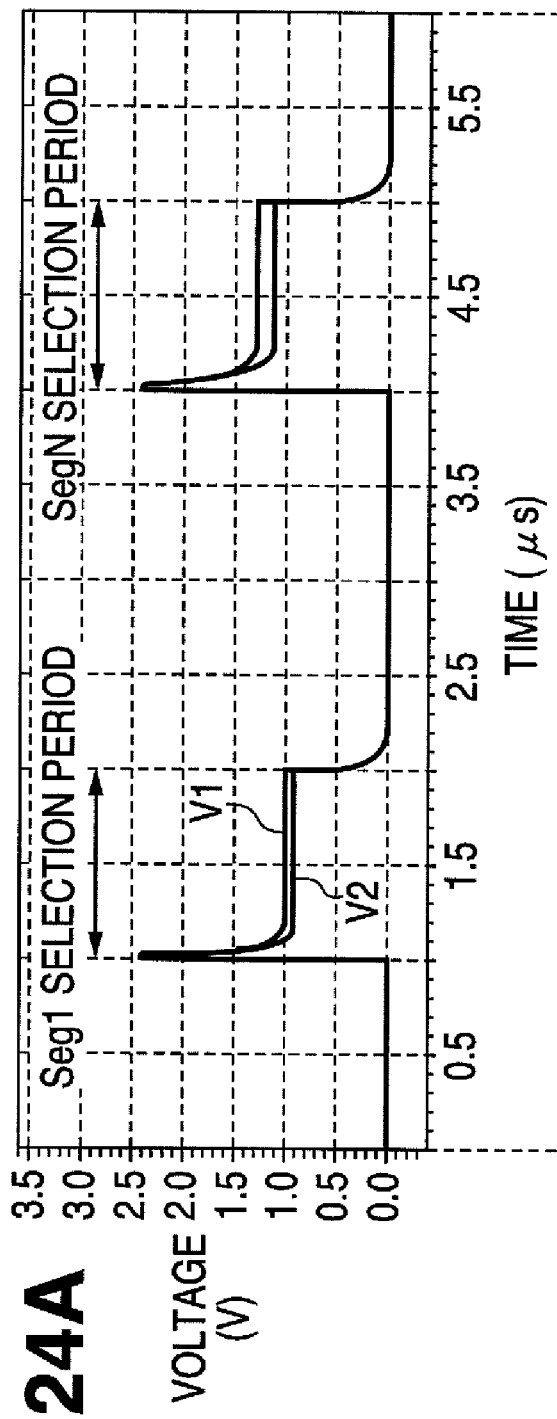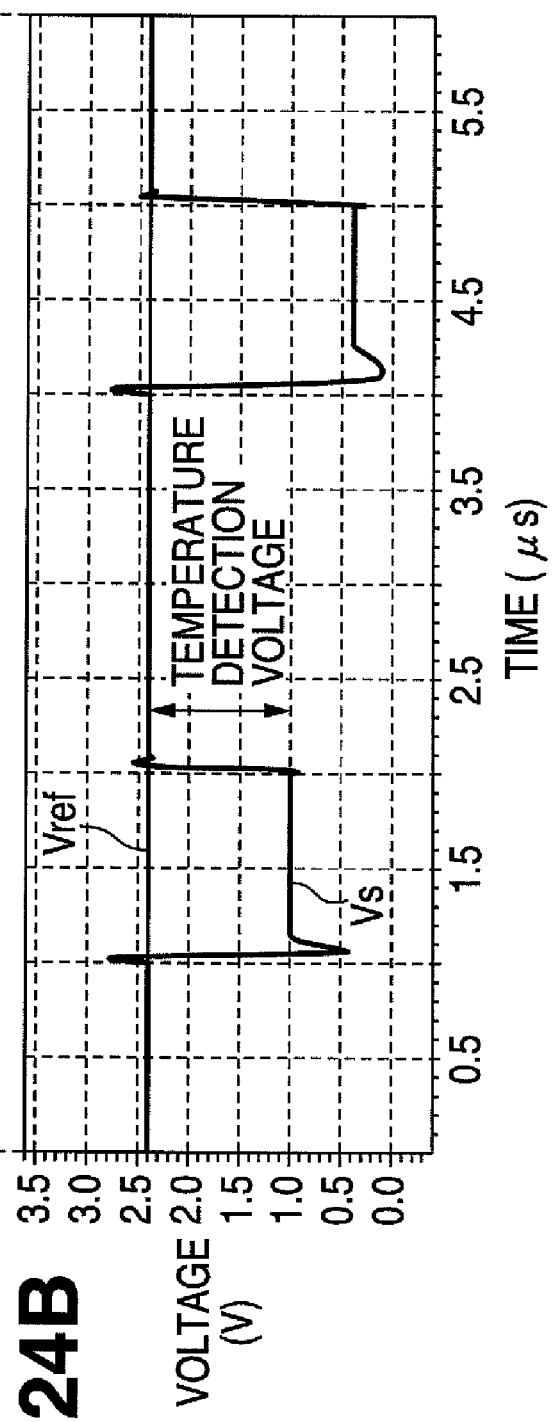

RECORDING HEAD THAT DETECTS TEMPERATURE INFORMATION CORRESPONDING TO A PLURALITY OF ELECTRO-THERMAL TRANSDUCERS ON THE RECORDING HEAD AND RECORDING APPARATUS USING THE RECORDING HEAD

BACKGROUND OF THE INVENTION

1. Field of the Invention

The present invention relates to a recording head discharging a liquid from discharge orifices by imparting thermal energy to the liquid and to a recording apparatus utilizing the recording head.

2. Description of the Related Art

In an ink jet head, an discharge fault sometimes occurs in all or some of the nozzles as a result of clogging of the nozzles by a foreign substance, or due to air bubbles getting into the ink supply channel or changes in the wettability of the nozzle surface. In particular, in a case that a full-line type ink jet head is used, in which multiple nozzles are disposed so as to span the full width of a recording sheet, important tasks that need to be carried out include identifying nozzles experiencing an discharge fault among the numerous nozzles, so as to compensate a portion of image corresponding to the faulty nozzles, and to reflect the information on the faulty nozzles in ink jet head recovery processing. Furthermore, in printers utilizing this type of ink jet head, the amount of ink discharged from the nozzles may vary depending on temperature variation in the ink jet head, which makes the density of printed images unstable. Suppressing such image degradation due to variation in the amount of discharged ink is especially important in ink jet heads of the above-described full-line type.

In view of the importance of the issue, various ink discharge failure detection techniques, methods of discharge failure compensation, control methods and devices, as well as various methods used for controlling discharged ink amount have been proposed in the past.

According to a configuration disclosed in Japanese Examined Patent Publication No. 04-006549, conductor sections, whose resistance values vary under the action of heat generated by heaters when ink is discharged from nozzles by imparting thermal energy to the ink, are disposed in locations permitting detection of the heat generated by the heaters and the application of discharge signals to the heaters is controlled by detecting variation in the resistance values, i.e. the temperature, of these conductor sections.

Moreover, Japanese Patent No. 2831778 disclosed an ink jet head, in which electro-thermal transducers (heaters) and membrane-type temperature detection elements are provided on the same support, such as a silicon substrate, etc., with the temperature detection elements provided such that they are superimposed on top of the heater array region. The ink jet head herein is composed of a thermal resistance layer used to form the heaters, a layer used to form the temperature sensors, which is arranged as a layer above the heaters and underlies the wiring in non-heater locations, and an insulating layer insulating the thermal resistance layer from the layer that forms the temperature sensors. In another embodiment of Japanese Patent No. 2831778, the heater array area is completely enclosed within the temperature sensor array region, with the temperature sensors arranged such that they are superimposed on top of the heater array as an upper layer. In this manner, it is proposed to improve the accuracy and responsiveness of temperature detection and temperature control.

In the ink jet printer of Japanese Examined Patent Publication No. 04-006549, conductors are disposed in locations, where their resistance values vary under the action of heat generated by the heaters and temperature is detected by detecting the amount of change in the resistance values of the conductors. As described in the document, the application of discharge signals to the heaters is suspended depending on changes in temperature, which correspond to the amount of change in their resistance values. However, the detection circuitry detecting the amount of change in the resistance values of the conductors is not explicitly described. Moreover, no construction or method is disclosed that would be capable of quickly identifying nozzles experiencing a discharge fault.

Furthermore, in the ink jet head of Japanese Patent No. 2831778, the heaters and temperature detection elements are provided on the same support, such as a silicon substrate, etc., and the temperature detection elements, which are formed in the shape of a membrane, are provided such that they are superimposed on top of the heater array region. For this reason, a discharge fault can be quickly detected, but the location of each nozzle experiencing an discharge fault cannot be identified.

SUMMARY OF THE INVENTION

An aspect of the present invention is to eliminate the above-mentioned conventional problems.

Moreover, another aspect of the present invention is to provide a recording head capable of detecting temperature information corresponding to each electro-thermal transducer and a recording apparatus utilizing the recording head.

According to an aspect of the present invention, there is provided a recording head for discharging a liquid from discharge orifices by applying thermal energy from electro-thermal transducers to the liquid. The recording head includes a driving unit configured to drive by dividing a plurality of electro-thermal transducers into a plurality of blocks and supplying electric current on a block-by-block basis based on recording data; a plurality of temperature sensors disposed in correspondence to each one of the plurality of electro-thermal transducers; a constant current source configured to apply a bias current to the plurality of temperature sensors in common; and a voltage output circuit having a first switching element for turning electric current supply from the constant current source to each temperature sensor ON and OFF, and a second switching element for obtaining a voltage generated at both terminals of the temperature sensor by the electric current supply to the temperature sensor regulated by the first switching element.

According to another aspect of the present invention, there is provided a recording apparatus which includes the aforementioned recording head (see previous paragraph); a transfer unit configured to transfer serial data to the recording head, the serial data including image data used for heating of each transducer of the plurality of electro-thermal transducers, block selection data used for selecting a group of the temperature sensors and a block of the plurality of electro-thermal transducers, and sensor selection data used for selecting the temperature sensor whose voltage is obtained by the voltage output circuit; a driving control unit configured to output signals used for heating the electro-thermal transducers of the recording head; and a temperature detection unit configured to detect a temperature by accepting an output of an amplifier circuit as input in synchronization with the heating carried out by the driving control unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating an example ink jet head of an exemplary embodiment.

FIG. 7 is a timing chart showing an exemplary control signal timing chart of heaters and switching elements in the present embodiment.

FIG. 8 is a schematic diagram of an example full-line type of ink jet printer utilizing the ink jet head of the present embodiment.

FIGS. 24A, 24B are diagrams showing exemplary results obtained by simulating an operation of the seventh exemplary embodiment.

DESCRIPTION OF THE EMBODIMENTS

Numerous embodiments of the present invention will now herein be described below in detail with reference to the accompanying drawings. The following embodiments are not intended to limit the claims of the present invention.

Figure 2A:
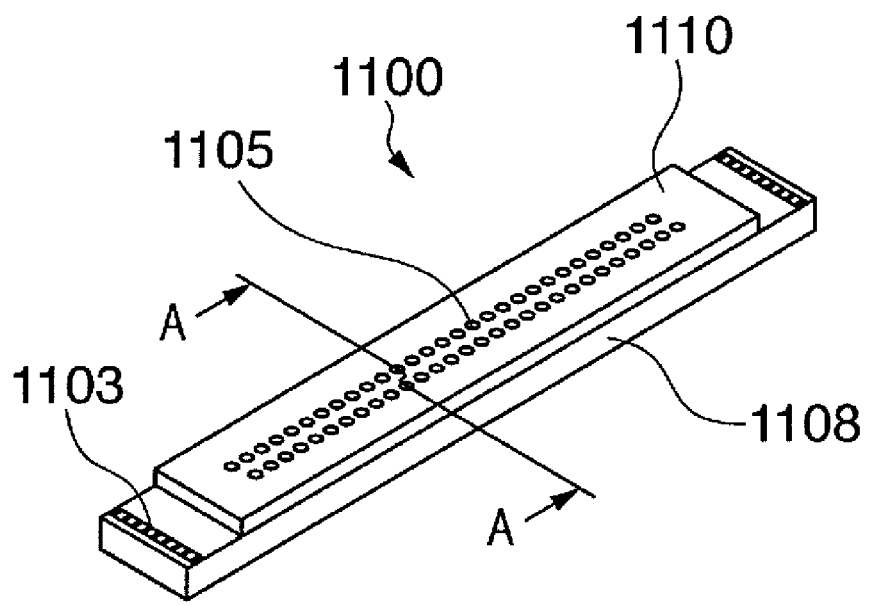
FIG. 2A is a diagram illustrating the construction of a recording element substrate and FIG. 2B is a cross-sectional view taken along line A-A in FIG. 2A.
Figure 2B:
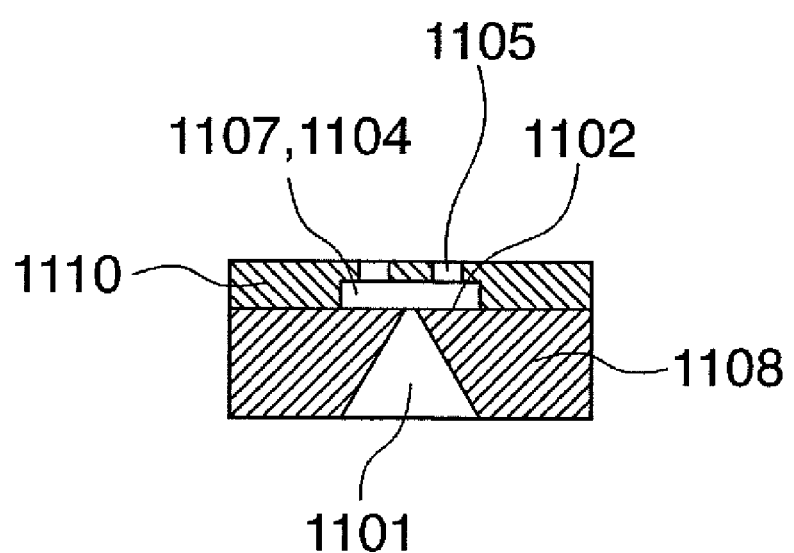

FIG. 1 through FIG. 2B are diagrams illustrating, respectively, an ink jet head, driving circuitry, and ink jet printer used in the embodiments of the present invention, as well as relationships therebetween. Below, the invention is explained while explaining the construction of each part with reference to these drawings.

FIG. 1 is a diagram illustrating the ink jet head of the present embodiment.

An ink jet head 1000 is an ink jet head of the type, wherein recording is carried out by generating heat in response to an electrical signal and imparting the heat to ink. The ink jet head 1000 is composed of recording element substrates 1100 (see FIG. 2A) and an ink supply unit. In addition, reference numeral 1800 denotes an ink tank containing ink of various colors.

FIG. 2A is a diagram illustrating the construction of the recording element substrates 1100 and FIG. 2B is a cross-sectional view taken along line A-A in FIG. 2A.

The recording element substrate 1100 has electro-thermal transducers (heaters) formed out of thin membranes on a Si substrate 1108 with a thickness of e.g. 0.5 to 1 mm. In addition, an ink supply passage 1101 (FIG. 2B) constituted by groove-shaped through bore is formed to serve as an ink channel, with electro-thermal transducers 1102 located on both sides of the ink supply passage 1101 in an arrangement staggered by one column. The electro-thermal transducers 1102 and electrical wiring of aluminum etc. are formed using layer deposition techniques. Moreover, electrodes 1103 (FIG. 2A) are provided to supply electric power to the electrical wiring.

Also, as shown in FIG. 2B, a nozzle plate 1110 is disposed on top of the Si substrate 1108, and a foaming chamber 1107, nozzles 1105, and an ink channel 1104 corresponding to the electro-thermal transducer 1102 are formed by photolithographic techniques. Moreover, the nozzles 1105 are provided opposing the electro-thermal transducer 1102. The ink supplied through the ink supply passage 1101 is heated by the electro-thermal transducer 1102 to generate air bubbles so that the ink is discharged from the nozzles 1105.

Figure 9A:
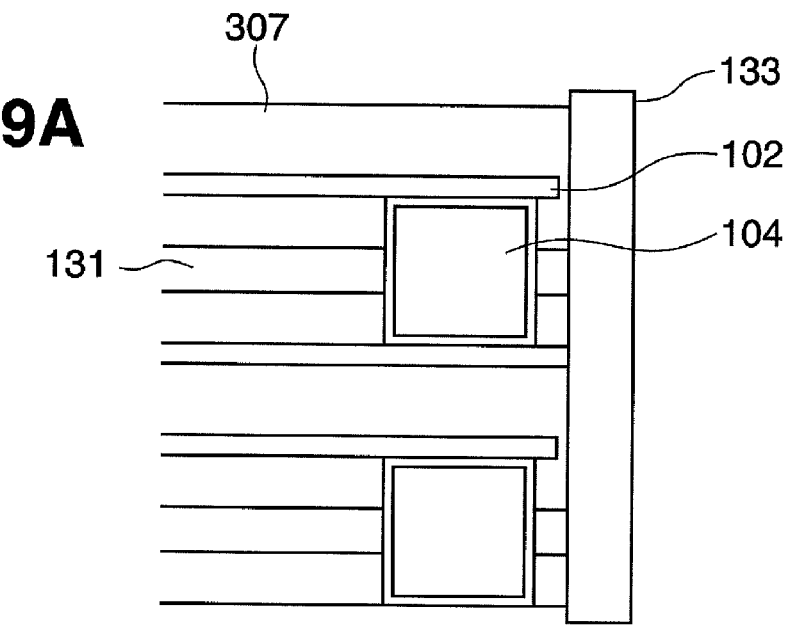
FIGS. 9A, 9B depict a cross-sectional view and plan view of the recording head, in which the discharge nozzles of the ink jet head of the present embodiment are omitted.
Figure 9B:
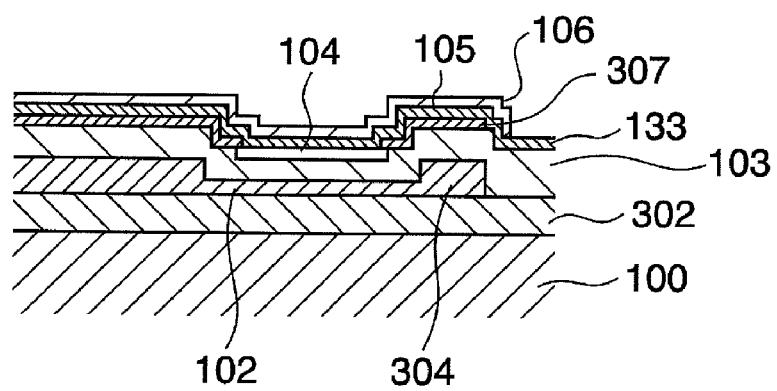

FIGS. 9A, 9B show a cross-sectional view and plan view of the recording head, in which the discharge nozzles of the ink jet head of the present embodiment are omitted.

A temperature detection element 102 formed out of thin film resistor, discrete wires 131 used for interconnect wiring, and common wires 133 are formed on a silicon substrate 100, with a field oxide film 302, which is made up of a thermal oxide film of $SiO_2$, etc., interposed between them and the substrate. Furthermore, wires 304, 307 are formed, which connect a heater 104 made up of an AlCu thin film resistor to a driving circuit 901, to be explained below (FIG. 6), formed on the silicone substrate 100. Moreover, a heater 104 of TaSiN etc., a passivation film 105 of $SiO_2$ etc., and an anti-cavitation film 106 of Ta etc. used to increase resistance to cavitation on top of the heater 104 are formed by high-density lamination using semiconductor fabrication processes, with an interlayer insulating film 103 interposed therebetween. The anti-cavitation film 106 is a protective film 106 that is formed by being layered in a high density with a semiconductor process, in order to reduce an effect of cavitation. The temperature detection elements 102 made up of thin film resistors are separately and independently disposed directly underneath each one of the heaters 104. The discrete wires 131 and common wires 133 of the temperature detection elements, which are connected to each of the temperature detection elements 102, form part of a temperature detection circuit 911 (FIG. 6) detecting information from the temperature detection elements 102.

In accordance with the present embodiment, the wire 304, which connects the heater 104 and a later-described control circuit formed on the silicon substrate 100, is formed on the silicone substrate 100, with the field oxide film 302, which is made up of a thermal oxide film of $SiO_2$ etc., interposed therebetween. Furthermore, the heater 104 of TaSiN etc., the passivation film 105 of $SiO_2$, etc., and the anti-cavitation film 106 of Ta etc. are formed on the field oxide film 302, with the interlayer insulating film 103 interposed therebetween. After that, the temperature detection elements 102 made up of thin film resistor, discrete wires 131 used for interconnect wiring, and common wires 133 are formed by deposition on the field oxide film 302 and subjected to patterning.

Next, explanations are provided regarding the heating operation of the heaters 104 in the present embodiment and the temperature profiles illustrating temperature detection results obtained by the temperature detection elements 102.

Figure 10:
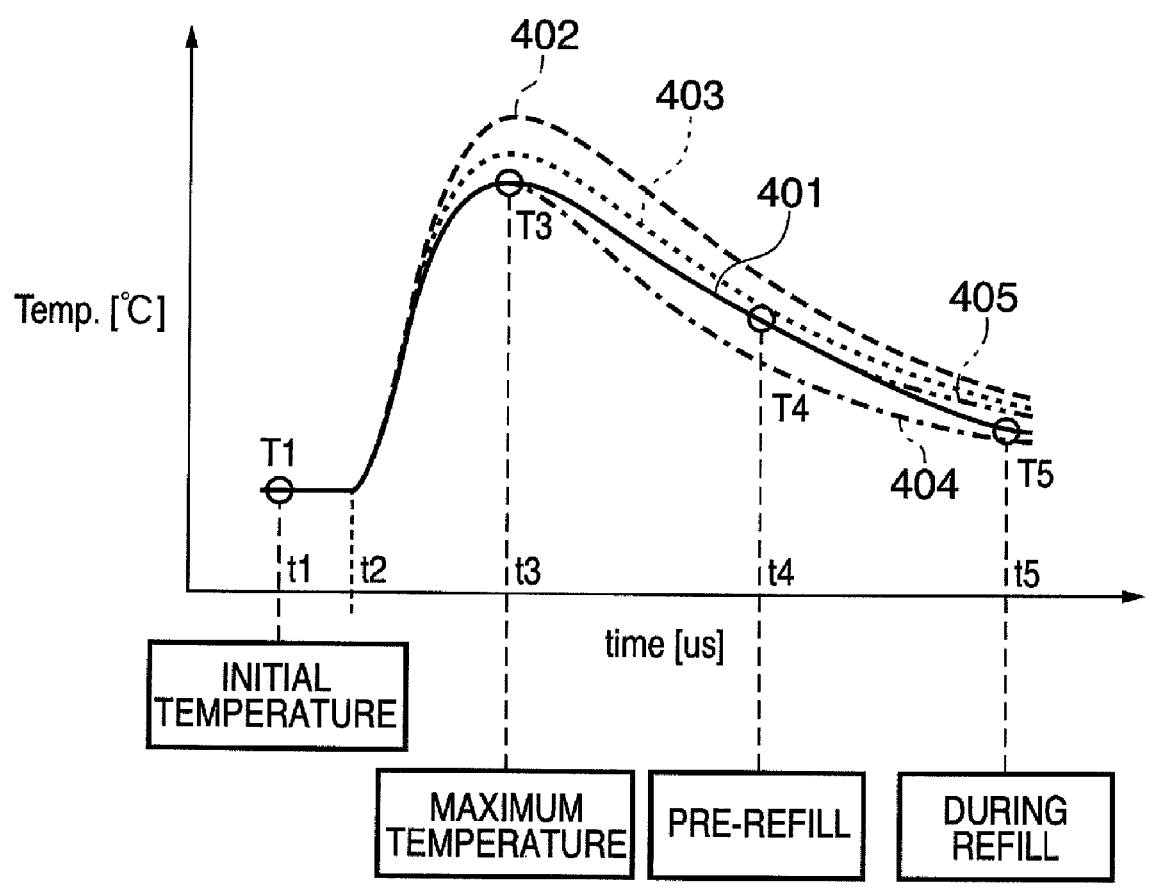
FIG. 10 is a diagram showing temperature profiles detected by a temperature detection element in case of normal discharge and abnormal discharge, obtained when a 20V pulse lasting 0.8 µs was applied to a heater with a resistance value of 360Ω.

FIG. 10 shows temperature profiles detected by the temperature detection element 102 in case of normal discharge and abnormal discharge, obtained when a 20V pulse lasting 0.8 μs (pulse width) is applied to the heater 104 with a resistance value of 360Ω. It should be noted that these temperature profiles were obtained for a single discharge operation.

The reference numeral 401 (thick solid line) denotes a temperature profile obtained during normal discharge. The reference numeral 402 (line of long dashes) denotes a profile obtained during abnormal discharge due to residual air bubbles remaining in the nozzles, and the reference numeral 403 (line of short dashes) denotes a profile obtained during abnormal discharge that occurred when contaminant matter accumulated in the channel and ink refilling could not be performed properly. The reference numeral 404 (dash-dot line) denotes a temperature profile obtained during abnormal discharge that occurred due to ink adhering to the surface of the nozzles. The reference numeral 405 (two-dot chain line) denotes a temperature profile obtained during abnormal discharge due to clogging of the nozzles caused by a foreign substance. This is what has been known about the relative shapes of such temperature profiles up till now.

For instance, in case of normal discharge (401), the initial temperature is T1 (25° C.) at time t1 and the application of the signal to the heater 104 starts at time t2 (0). Here, the signal is applied for 0.8 μs and, at time t3 (about 2 μs later), the maximum temperature, T3=170° C., is reached. Then, about 5 μs later, at time t4, the temperature changes to a pre-refill temperature T4 (about 80° C.). Furthermore, about 9 μs later, at time t5, the temperature changes to a temperature T5 (about 45° C.) during the refill operation. By contrast, during the abnormal discharge illustrated by profiles 402 through 405 of FIG. 10, the temperature waveform exhibits characteristic differences relative to the normal discharge. Namely, because the detected temperature waveforms are different, abnormal discharge can be detected by detecting temperature at the appropriate timing. For instance, the time points t1, t3, t4, and t5 are suitable for use in the temperature profiles of FIG. 10.

Figure 3A:
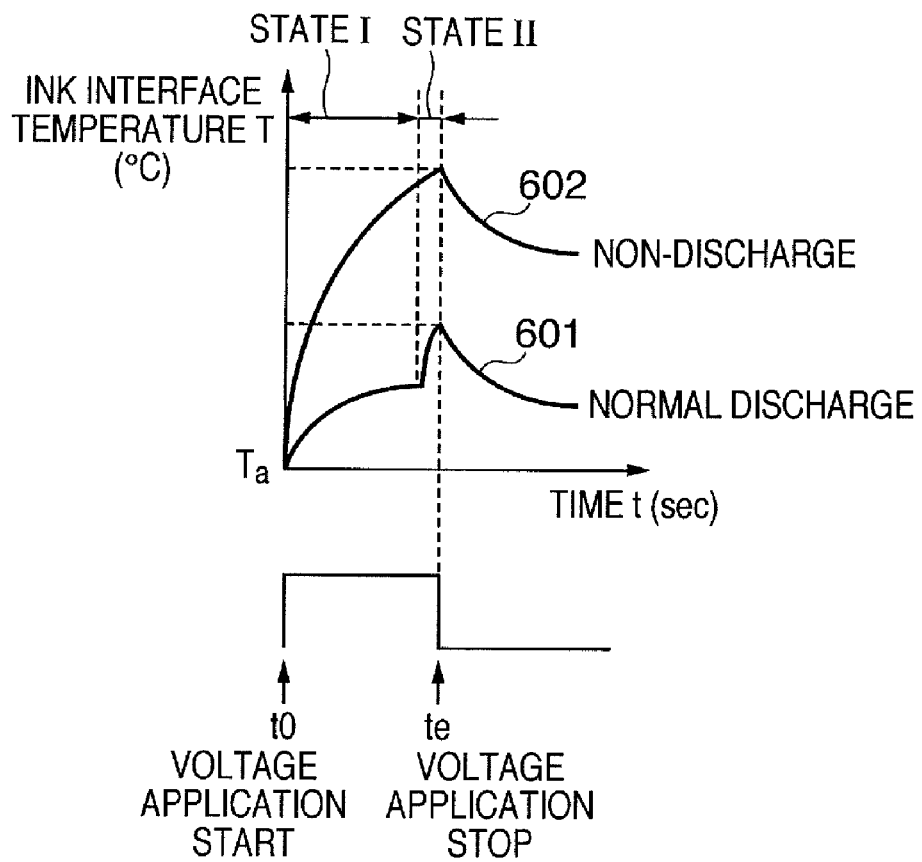
FIG. 3A is a diagram illustrating the states of the temperature profiles of the present embodiment.
Figure 3B:
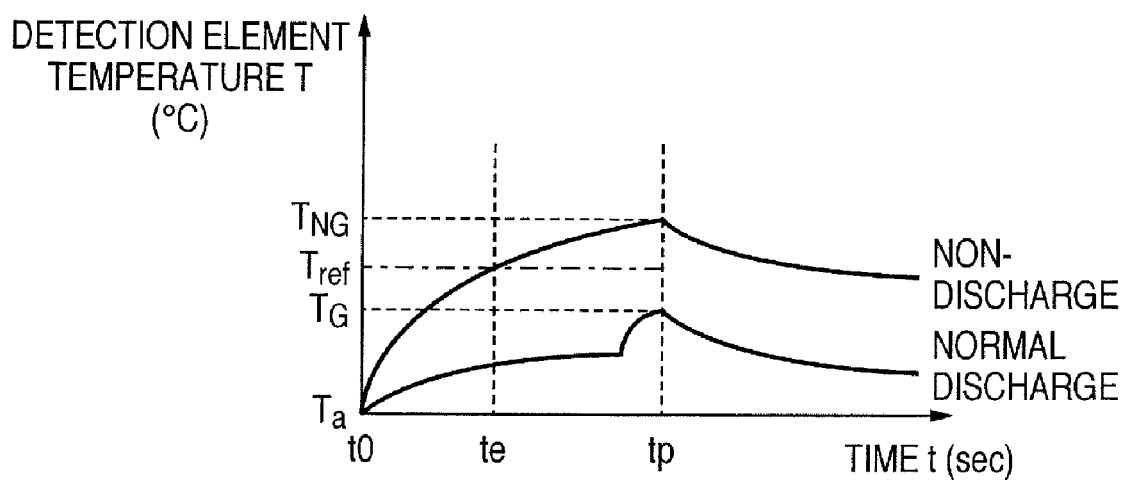
FIG. 3B is a state diagram of the temperature profiles illustrating the results of experiments and temperature simulation conducted by the inventors of the present application.

FIG. 3A and FIG. 3B are diagrams illustrating the states of the temperature profiles of the present embodiment. Here, FIGS. 3A and 3B show a temperature profile 601 of the ink interface (anti-cavitation film 106) during normal discharge of ink and a temperature profile 602 of the ink interface (anti-cavitation film 106) in case of ink non-discharge.

When ink is discharged properly, the temperature of the heater 104 starts rising from time t0 when the signal is first applied to the heater 104 and, concurrently therewith, the temperature of the interface of the anti-cavitation film 106 rises (State I). Furthermore, as the temperature of the heater 104 rises and the temperature of the interface of the anti-cavitation film 106 rises, the temperature of the ink interface reaches a certain temperature, at which air bubble generation accelerates and a state is achieved, wherein there is no ink separating them from the anti-cavitation film 106. For this reason, the temperature of the anti-cavitation film 106 and heater 104 starts increasing more rapidly (State II). Upon elapse of a certain time period after detecting this rapid temperature increase, the application of the signal to the heater 104 is stopped at time te, which is the timing of the end of application. As a result, the rise in the temperature of the heater 104 stops, and the temperature of the anti-cavitation film 106 starts dropping as well. In this manner, air bubbles in the ink disappear, the recording head returns to the initial ink-filled state, and the temperature of the heater 104 decreases as well.

On the other hand, to provide an example of ink discharge failure (602), explanations will be provided regarding a case wherein, for instance, no ink is present at the interface of the anti-cavitation film 106 (foaming-induced ink discharge failure). In this case, the temperature of the interface of the anti-cavitation film 106 starts rising rapidly at time t0, which is the time at which the signal application to the heater 104 is started. Subsequently, when the application of the signal to the heater 104 stops at time te, which is the application end time, the temperature of the heater 104 drops and the temperature of the interface of the anti-cavitation film 106 drops as well.

Incidentally, in the present embodiment, the temperature of the heater 104 and anti-cavitation film 106 can be quickly and accurately detected because, as shown in FIG. 9B, the temperature detection elements 102 are formed directly below the heaters 104, with the interlayer insulating film 103 interposed therebetween.

Figure 4:
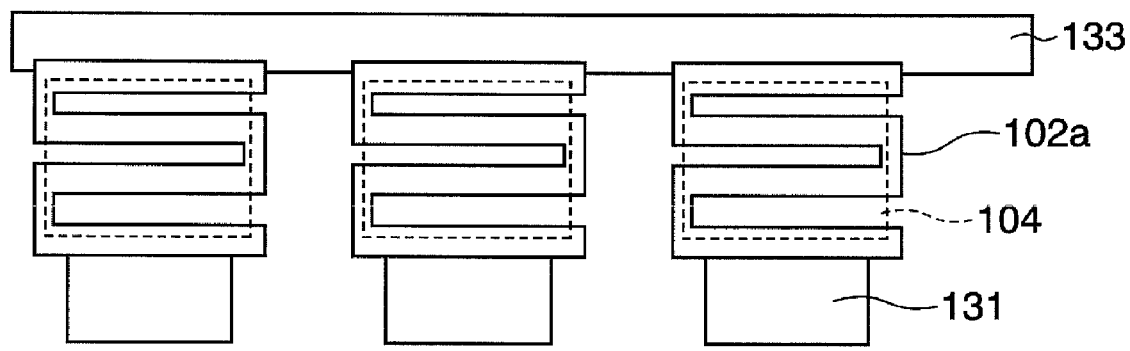
FIG. 4 depicts a plan view showing an example shape of temperature detection elements used in the embodiments of the present invention.

FIG. 4 depicts a plan view illustrating the shape of the temperature detection elements in a modification of the present embodiment.

In the previously described example, square temperature detection elements 102 were disposed directly underneath the heaters 104. By contrast, in FIG. 4, serpentine temperature detection elements 102a are disposed directly underneath the heaters 104. In case of the previously described square temperature detection elements 102, the planar shape of the heaters 104 can be rendered flat, with the interlayer insulating film 103 interposed therebetween. For this reason, the arrangement has the advantage of making the discharge of ink from each nozzle more stable. By contrast, in the serpentine temperature detection elements 102a of FIG. 4, the resistance values of the temperature detection elements 102 can be set high, which has the advantage of permitting highly accurate detection of minute temperature variations.

Next, explanations are provided regarding the non-discharge detection circuit and head driving circuit of the present embodiment.

As shown in FIG. 1, the ink jet head 1000 of the present embodiment has four recording element substrates 1100a-1100d precisely arranged on a chip plate. Furthermore, the four recording element substrates 1100a-1100d are wired on an electric wiring board.

Figure 5:
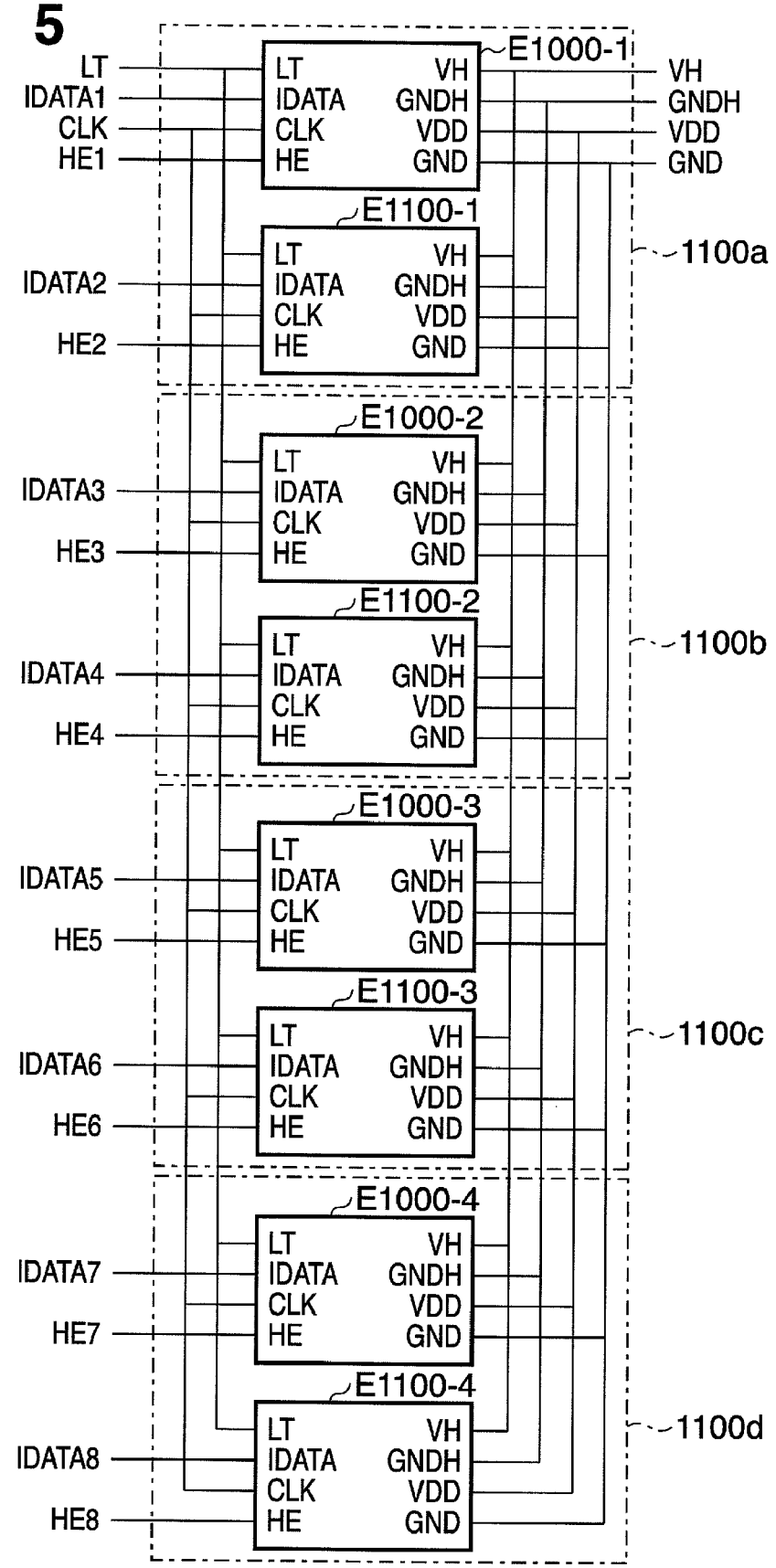
FIG. 5 is a circuit diagram showing an example outline of signal wiring used between four recording element substrates.

FIG. 5 is a circuit diagram representing an outline of the signal wiring between these four recording element substrates 1100a-1100d. In FIG. 5, the reference numerals 1100a-1100d correspond to the four recording element substrates shown in FIG. 1, with each of the recording element substrates furnished with two, odd and even, nozzle columns, as well as their driving circuits. For instance, the recording element substrate 1100a comprises an odd nozzle column E1000-1 and an even nozzle column E1100-1, as well as their driving circuits. HE (Heat Enable) and IDATA, which are provided in each element substrate separately for odd and even columns, are indicated using signal names HE1-HE8 and IDATA1-IDATA8 depending on the recording element substrate. In addition, a latch signal LT, a clock signal CLK, and a power line are wired in common between the recording element substrates. Both in the odd and even nozzle columns, 640 nozzles are arranged at a 600 dpi pitch, with the odd and even nozzle columns shifted by half a pitch. For this reason, each of the recording element substrates provides 1280 nozzles at 1200 dpi. It should be noted that, in FIG. 5, E1000-1-E1000-4 represent driving circuits driving the odd-numbered nozzles of the recording element substrates and E1100-1-E1100-4 represent driving circuits driving the even-numbered nozzles of the recording element substrates.

First Exemplary Embodiment

Figure 6:
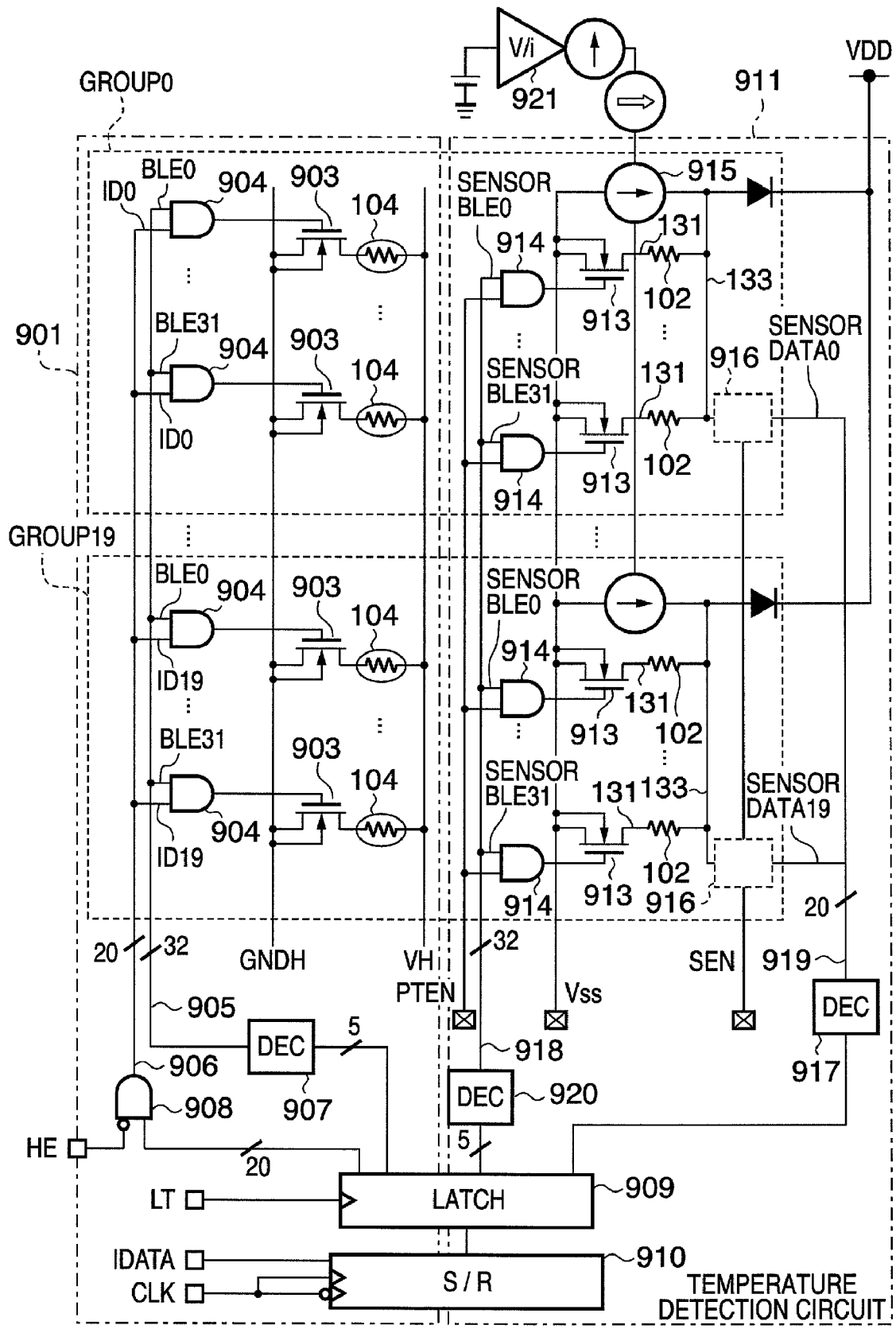
FIG. 6 is a block diagram outlining example driving circuits used in a first embodiment of the present invention.

FIG. 6 is a block diagram outlining the temperature detection circuits and driving circuits of the heaters of the ink jet head in the first embodiment of the present invention.

The driving circuit 901 illustrates the configuration of the driving circuit E1000-1 used for the odd nozzle columns (or the driving circuit E1100-1 used for the even nozzle columns) in the recording element substrates of FIG. 5. It should be noted that other nozzle column driving circuits E1000-2 to E1000-4 (or even nozzle column driving circuits E1100-2 to E1100-4) have the same configuration.

Here, a single segment is composed of a heater 104, a switching element 903 driving the heater 104, and an AND gate 904, which computes the logical product of selection signals and ON/OFF signals. Here, there is a total of 640 segments, with the segments divided into 20 groups (groups 0-19) and each group composed of 32 segments. Then, an exemplary configuration is shown, which is driven using 32 time divisions×20 time divisions. A BLE (Block Enable) wire group 905, which is wired in common to all the groups, is composed of 32 signal lines BLE0 to BLE31, i.e. 32-bit block selection signals selecting a single segment within each group (simultaneously selecting 20 segments). Each of the 32 signal lines from BLE0 to BLE31 is connected to a respective one of the AND gates 904 in each group. A driving data wire group 906 is composed of 20 signal lines ID0 to ID19, i.e. 20-bit ON/OFF signals corresponding to print data, and is wired to each group separately. A decoder (DEC) 907 accepts 5-bit block numbers as input from a latch circuit 909 and generates the block selection signals BLE0 to BLE31. An AND gate 908 determines the pulse width and application timing of the pulse applied to each of the heaters 104. The AND gate 908 computes the logical product of the applied pulse HE (Heat Enable) signal and print data, generating data signals ID0~ID19. The latch circuit 909 and shift register 910 accept and store serial data IDATA. In other words, IDATA, which is supplied in synchronization with the CLK, is serially transferred and stored in the shift register 910. In this manner, the data stored in the shift register 910 is stored in the latch circuit 909 in response to a latch signal LT outputted at the start of the next driving block. For this reason, the timing with which the heaters 104 of the blocks, to which initially transferred data corresponds, are actually driven is the timing, with which the transfer of data printed in the next block is carried out.

Here, the data transferred to the shift register 910 include the numbers (0 to 31) of the blocks driven by the data, the driving data (print data) of the heaters 104 driven in the blocks, selection data of analog switches 916, as well as switch data of the temperature detection elements 102. The switch data is data selecting the temperature detection elements 102 in the hereinafter described temperature detection circuit 911. Upon receipt of driving block-designating number data, the DEC 907 performs decoding to BLE0 to BLE31 and simultaneously selects one heater among the 32 heaters 104 contained in the group (in other words, a total of 20 heaters). Concurrently therewith, respective 20-bit print data ID0 to ID19 having the pulse width of HE is supplied to the corresponding heaters 104 to drive them.

By proceeding in the above-described manner, the 0-th block is driven first, followed by the 1st, 2nd, 3rd . . . block, and, when finally the driving of block 31 (BLE31) is over, ink has been discharged from all the nozzles of all the recording element substrates 1100a-1100d in accordance with the print data and the printing operation is performed.

The temperature detection circuit 911 is explained next. At one side of the temperature detection element 102, there is provided a switching element 913, which is connected to the wire 131 and effects ON/OFF control of the temperature detection element 102. In addition, the common wire 133 shared by all the groups is connected to the terminal at the other side of the temperature detection element 102. A plurality of temperature control elements 102 are connected to the common wire 133. A single segment is then composed of an AND gate 914, which computes the logical product of the block selection signals BLE and ON/OFF signals PTEN, the switching element 913, and the temperature detection element 102, thereby forming a temperature detection element group. Here, corresponding to the number of the heaters 104, there are 640 temperature detection elements. Then, in the same manner as with the driving circuit 901, they are subdivided into 20 groups of 32 elements each, with sensor output selected using a 32×20 matrix. A sensor BLE wire group 918 is composed of 32 signal lines "sensor BLE0 to BLE31", i.e. 32-bit block selection signals selecting a single temperature detection element 102 in each group, and is wired in common to all the groups. Each of the signal lines BLE0 to BLE31 is connected to a respective one of the AND gates 914 in each group. A sensor DATA wire group 919 is composed of 20 signal lines "sensor DATA0 to DATA19", i.e. 20-bit group selection signals selecting a single group among 20 groups, and is wired to each group separately.

To each group, a constant current source 915, which supplies a constant current to the temperature detection elements 102, and an analog switch 916, which switches the outputs of the temperature detection element groups, are connected. A reference current source 921 controls the current value of the constant current source 915. The control circuit controlling the switching elements 913 and analog switch 916 is composed of a decoder (DEC) 920 receiving sensor block numbers and generating sensor block selection signals (sensor BLE0 to BLE31) and a decoder (DEC) 917 receiving temperature detection element group numbers and generating group selection signals (sensor DATA0 to DATA19).

IDATA, i.e. sensor block numbers transferred to the serial register 910 and latched by the latch 909, are received, and all of the 32 switching elements 913 belonging to the blocks selected based on the sensor block selection signals (sensor BLE0 to BLE31) are selected.

On the other hand, temperature detection element group numbers transferred in the same manner are received, and the analog switch 916 selected based on the group selection signals (sensor DATA0 to DATA19) outputted from DEC 917 is turned ON. As a result, only one of the temperature detection elements of the selected block, the one that belongs to the selected group, is selected. Temperature information from the selected temperature detection element 102 is then outputted as a voltage signal from an output terminal SEN in synchronization with the signal PTEN.

In this manner, the output of each temperature detection element 102 is selected by controlling the switching elements 913 and AND gates 914, which select a set of 20 temperature detection elements, and the analog switch 916, which selects one of the groups (group 0 through group 19). Providing the analog switch 916 makes it unnecessary to have wiring for taking detection signals directly from each of the elements 102 of the temperature detection element groups. Therefore, the number of wires and terminals can be reduced.

FIG. 7 is a timing chart showing an exemplary control signal timing chart used for driving the heaters 104 and obtaining temperature information from the temperature detection element 102.

The temperature detected by the temperature detection element 102 peaks approximately 1.2 μs after the time (e.g., te in block 0) of the end of driving of the heater 104. Now, if the pulse width (HE pulse width) applied to the heater 104 is set to 0.8 μs, the temperature peak of the heater 104 is reached 2 μs after the time of the start of application (e.g. at t0 in block 0). Although time division driving is normally used when driving a plurality of nozzles, depending on various conditions, there may be cases, in which the duration of time division is approximately 2 μs or less. In such a case, as shown in FIG. 7, the peak value of the temperature of the heater 104 driven in this block cannot be obtained while the block is selected and, therefore, while the subsequently driven block is selected, it is necessary to determine the temperature peak of the heater 104 driven in the previous block. The example of FIG. 7 shows an example of detection of the temperature of the heater 104 driven in block 0, wherein the temperature of the heater 104 is detected by setting the sensor BLE signal to "0" when the heater 104 of the subsequent block 1 is selected.

Thus, in the first embodiment, the driving of the heaters by the driving circuit 901 is not operatively associated with the temperature detection operation performed by the temperature detection elements 102. For this reason, considering the temperature detection element 102 to be detected, the temperature of a heater 104 of a block is detected during selection time of another block subsequent to the block, in which the heater 104 was driven, based on the selection of the control signals of sensor BLE and sensor DATA (selection of the analog switch 916). In FIG. 7, as mentioned above, the temperature peak value is indicated for a case, in which it is about 2 μs (tp) from the start of heating and the time division duration td of heater driving is set to 2 μs.

FIG. 7 illustrates the timing, at which sensor DATA is 0, i.e. the timing of detection of the temperature of the heater 104 of group 0. For instance, when the output of the temperature detection element 102 corresponding to the heater 104 selected in block 0 (BLE0) of the heaters 104 of group 0 is detected, the temperature of the heater 104 is measured using the temperature detection element 102 at four points in time, i.e. prior to driving the heater 104, at peak temperature, prior to refilling, and during refilling. The reason for this is as explained in the previously described FIG. 10.

When the above-described circuitry is used, the temperature of the heater 104 can be measured at time points prior to and after heating of the heater 104 using the sensor BLE. Here, using the temperature detected at the time point prior to heating as the default value makes it possible to take the influence of the ambient temperature, continuous printing, etc. into consideration. At such time, when the heater BLE is "0", sensor BLE selects "1" and detects the output voltage. Since the switching elements 913 is controlled in this manner in a temperature detection circuit 911 independent of the driving circuit 901, information from the temperature detection element group can be obtained even if the timing is not necessarily the same as the heating timing. This permits a flexible approach to detection timing that is not predicated on the driving of the heater 104.

To convert the information of the above-described temperature detection circuit 911 to digital values, an A/D converter may be provided and the results of temperature detection may be handled as digital data. This has the advantage of improving noise resistance. In addition, an arrangement is possible, in which a comparator is provided at the output terminal SEN and the voltage of each temperature detection element 102 is compared with a reference voltage $V_{ref}$ corresponding to $T_{ref}$ to detect an abnormal nozzle. Although these circuits may be formed on top of the Si substrate 100 (FIG. 9B), it is also possible to form them as separate external circuits.

FIG. 8 is a schematic diagram of a full-line type of ink jet printer utilizing the ink jet head of the present embodiment.

The reference numeral 2210 denotes a paper feed cassette and numeral 2209 denotes a manual paper feed tray. Paper feed systems used for feeding recording paper P, which is supplied with the help of a paper feed cassette 2201 or manual paper feed tray 2209, include a system, in which a recording paper is separated sheet-by-sheet using a delivery roller 2211 and a divider pad (the Duplo system), the separation claw system, the sheet retarder system, etc. The front edge of a recording sheet supplied using the paper feed cassette 2210 or manual feed tray 2209 abuts the nip between a pair of registration rollers 2204, 2205, which are not rotating, and the delivery roller 2211 is slightly rotated in this state. As a result, the recording sheet undergoes sagging between the registration roller 2204 and delivery roller 2211, thereby compensating the slanted transfer of the recording sheet. Furthermore, when the abutment of the recording sheet against the nip of the registration roller pair 2204, 2205 is detected by a photo sensor (not shown), the registration rollers 2204, 2205 are rotated. Images can be printed in predetermined positions on the recording sheet by adjusting the timing of ink jet head driving (heater driving) using the start of rotation of the registration rollers 2204, 2205 as a trigger.

The recording sheet conveyed by the rotation of the registration rollers 2204, 2205 is sandwiched between a conveyor belt 2206 and a pair of pinch rollers 2207, 2208. Furthermore, because a high voltage is applied to the lower roller 2208 of the pinch rollers and, in addition, the upper roller 2207 is grounded, the recording sheet passing through the pinch roller pair 2207, 2208 adheres to the conveyor belt 2206 under the action of electrostatic attraction and is conveyed thereon. The recording sheet adhered to the conveyor belt 2206 under the action of electrostatic attraction is conveyed to the printing start position directly underneath the ink jet heads 2221 to 2224 by the conveyor belt 2206 driven by the rotation of a driving roller 2201 rotationally driven by a motive source, which is a pulse motor, not shown. The conveyor belt 2206 is extended and mounted on the driving roller 2201, a driven roller 2202, and a pressure roller 2203. The pressure roller 2203 is rotatably attached to one end of an arm (not shown), which has its other end pivotally attached to a frame, not shown, with the arm being urged by a spring in such a manner that a tensile force is applied to the conveyor belt 2206.

The reference numerals 2221 to 2224 denotes full-line type ink jet heads, which respectively have a plurality of recording elements (nozzles) arranged spanning the entire width of the printable area of the recording sheet P. They are arranged at predetermined intervals in the following order from the upstream side in the direction of conveyance of the recording sheet P: head 2224 (Black), head 2223 (Yellow), head 2222 (Magenta), and head 2221 (Cyan). These ink jet heads 2221 to 2224 are attached to a head holder.

In the above configuration, the recording sheet adheres to the top face of the conveyor belt 2206 under the action of electrostatic attraction and is conveyed by the conveyor belt 2206 while being printed on by the above-described ink jet heads.

The reference numerals 2212, 2213 designate a pair of paper discharging rollers, driven to convey paper by the rotational force of the roller 2212 provided by a transmission means, not shown. The printed recording sheet is sandwiched between the paper discharging roller 2212 and spur 2213, discharged into a paper output tray 2214, and held therein. Because the spur 2213 comes into contact with the freshly printed top face of the recording sheet, the surface of its contact with the recording sheet is reduced by imparting a sharpened shape to the tips in order to avoid transferring the ink of the printed image.

Next, explanations are provided regarding the non-discharge detection circuit that detects ink non-discharge based on temperature profiles similar to those shown in FIG. 3A and FIG. 3B.

Figure 11:
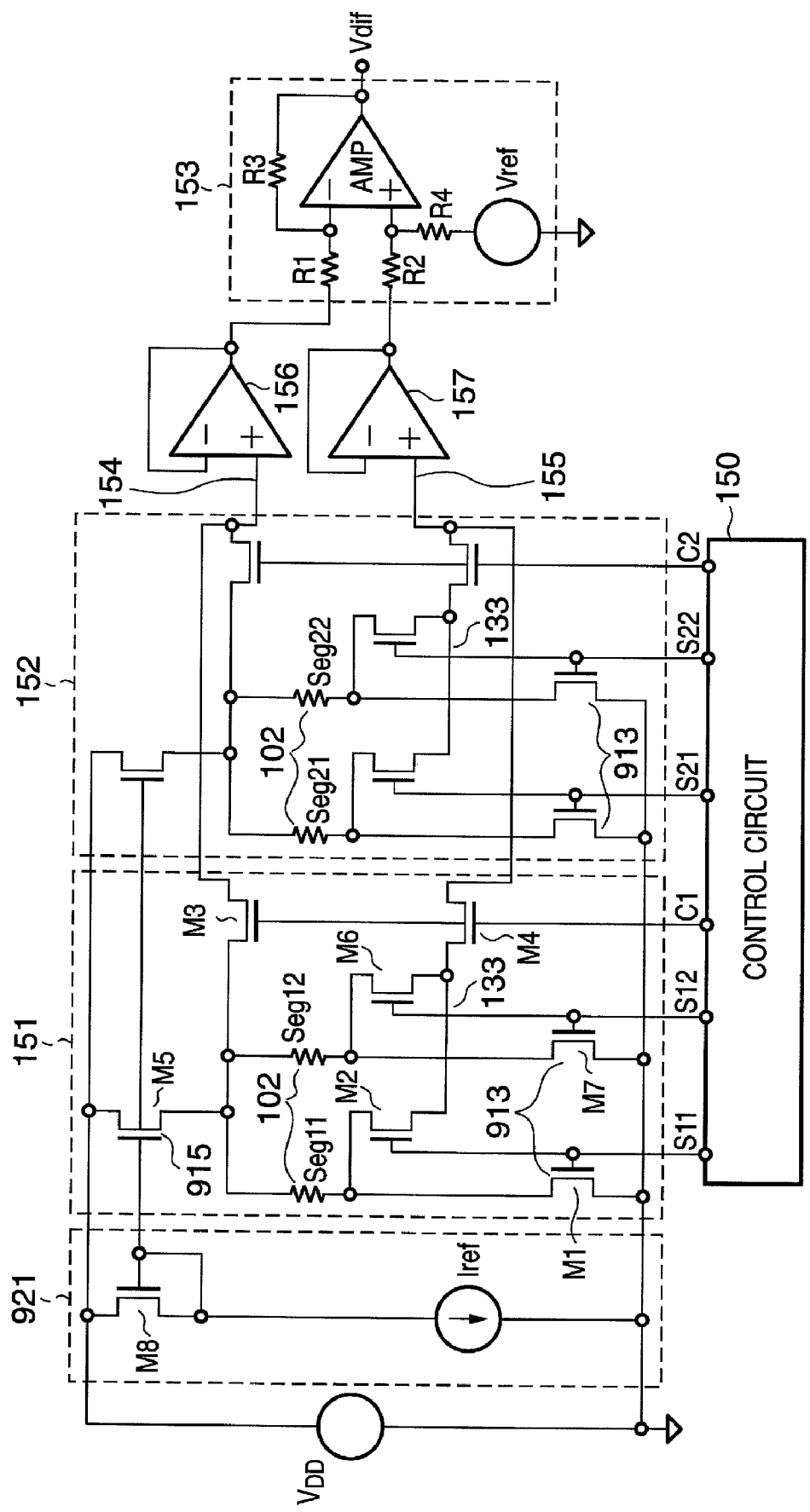
FIG. 11 is a circuit diagram showing an example configuration of a non-discharge detection circuit used in the first exemplary embodiment of the present invention.

FIG. 11 is a circuit diagram illustrating the configuration of the non-discharge detection circuit of the first embodiment of the present invention, with parts common with the previously described FIG. 6 designated by the same reference numerals. This circuit is driven by the power supply voltage VDD.

A temperature detection element group 151 includes thin-film resistors seg11 and seg12, which operate as temperature detection elements 102, and MOS transistors M1, M7 (913), which are connected to these temperature detection elements 102 in series and turn the temperature detection elements 102 ON and OFF. In addition, it includes a constant current source M5 (915), which supplies constant electric current to these temperature detection elements 102, an MOS transistor M3 (916) operating as an analog switch connected to one of the terminals of the temperature detection elements seg11, seg12, and MOS transistors M2, M6 (916) operating as analog switches provided separately at the other terminals of the temperature detection elements seg11, seg12. Furthermore, it includes a common wire 133, which connects to the outputs of the analog switches M2, M6 (916), and an analog switch M4 (916), which is connected to the common wire 133. In order to make the explanation easier to understand, in the case illustrated herein, there are two temperature detection elements 102 belonging to the temperature detection element group 151. In addition, a temperature detection element group 152 has the same configuration.

A reference current source 921 generates a constant electric current using the power supply voltage VDD and includes a constant current source $I_{ref}$ and an MOS transistor M8 which, along with driving the constant current source $I_{ref}$, forms a current mirror in conjunction with the constant current sources M5 of the temperature detection element groups 151, 152. The control circuit 150 generates a signal S11 that turns the switching element M1 and analog switch M2 ON and OFF, a signal S12 that turns the switching element M7 and analog switch M6 ON and OFF, and a signal C1 that turns the analog switches M3, M4 ON and OFF. Control signals S21, S22, and C2 used for the temperature detection element group 152 are generated in the same manner. Buffer amplifiers 156 and 157 are respectively connected to wires 154 and 155 and receive an output of the selected temperature detection element with a high input impedance so as to output a differential amplifier 153. The differential amplifier 153 is connected to the outputs of the buffer amplifiers 156 and 157 and has gain setting resistors R1, R2, R3, R4 and a reference voltage $V_{ref}$.

First of all, the signal C1 is used to turn the analog switches M3 and M4 ON. Subsequently, the signal S11 is used to turn the switching element M1 ON and supplies the constant electric current set by the reference current source 921 as a bias current (constant current) to the temperature detection element seg11 through the constant current source M5. Voltage is generated at both terminals of the temperature detection element seg11 in response to the resistance value of the temperature detection element seg11 corresponding to the temperature at that time, and the current value of the preset bias current. In this manner, the voltage generated in the temperature detection element seg11 is transmitted to wires 154, 155 via the analog switches M3, M2, and M4. Therefore, the differential amplifier 153 accepts a voltage $V_{com}$ of the wire 154 and a voltage $V_{seg}$ of the wire 155 via the buffer amplifiers 156 and 157 as input. Here, a differential voltage $V_{dif}$ is outputted based on the gain setting resistors R1, R2, R3, R4 and reference voltage $V_{ref}$. The differential voltage $V_{dif}$ is given by the formula below.

$$V_{dif} = -A(V_{com} - V_{seg}) + V_{ref}$$

It should be noted that here A=R3/R1, R1=R2, and R3=R4.

Thus, the voltage $V_{dif}$ corresponding to the temperature detected by the temperature detection element seg11 is read out. Next, when the temperature detected by the temperature detection element seg12 is read, the signal C1 turns the analog switches M3 and M4 ON, the signal S12 turns the switching element M7 and analog switch M6 ON, and the detection voltage $V_{dif}$ of the temperature detection element seg12 is read out. In case of temperature detection element seg21 and temperature detection element seg22 of the temperature detection element group 152, the detection voltages of these temperature detection elements are read out in the same manner. By performing matrix driving (here, a matrix with 2 columns×2 rows) in this manner, the voltages (temperatures)

generated by the temperature detection element can be selected using time division and read out.

Figure 12A:
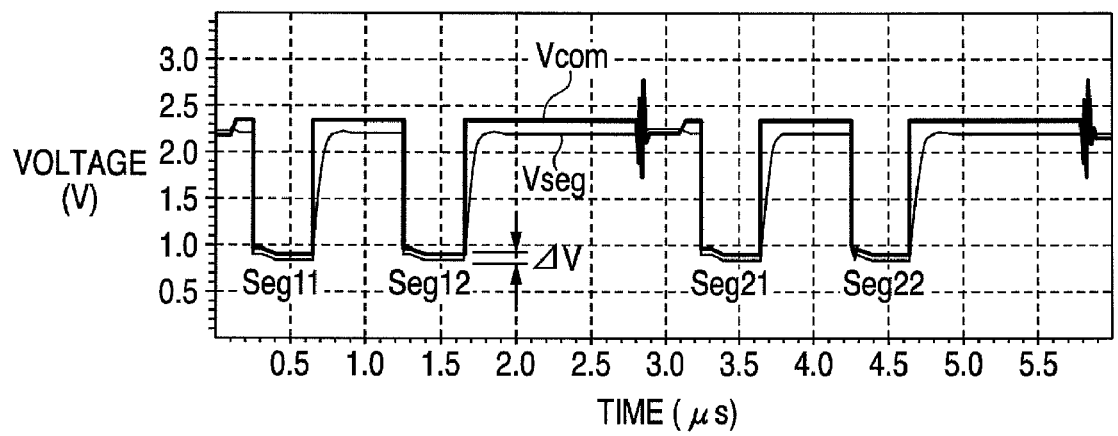
FIGS. 12A, 12B are diagrams showing exemplary results obtained by simulating temperature measurement operations.
Figure 12B:
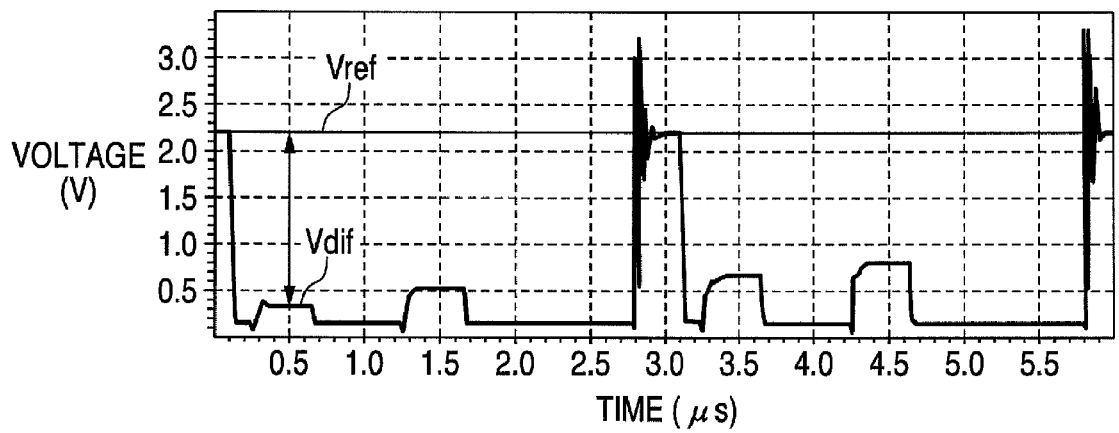

FIG. 12A and FIG. 12B are diagrams showing exemplary results obtained by simulating this series of temperature measurement operations.

FIG. 12A shows an example of the voltage $V_{com}$ of the wire 154 and voltage $V_{seg}$ of the wire 155. The symbol $\Delta V$ shown in FIG. 12A denotes the output voltage (detection voltage) of the temperature detection element 102 having a resistance value corresponding to the temperature. In the case illustrated herein, the bias current is 3 mA, the resistance values of the temperature detection elements seg11, seg12, seg21, and seg22 are respectively 31Ω, 27.9Ω, 24.8Ω, and 21.7Ω. FIG. 12B illustrates the relationship between the reference voltage $V_{ref}$ and differential voltage $V_{dif}$ multiplied by a gain A.

Here, the gain A is 20, and the reference voltage $V_{ref}$ is set to 2.2 V. It can be seen that the temperature detection voltages $V_{dif}$ obtained when the bias current application time of the respective temperature detection elements seg11, seg12, seg21, and seg22 is set to 400 µs are in accordance with the respective expected values, i.e. 1800 mV, 1670 mV, 1490 mV, and 1300 mV.

Figure 13:
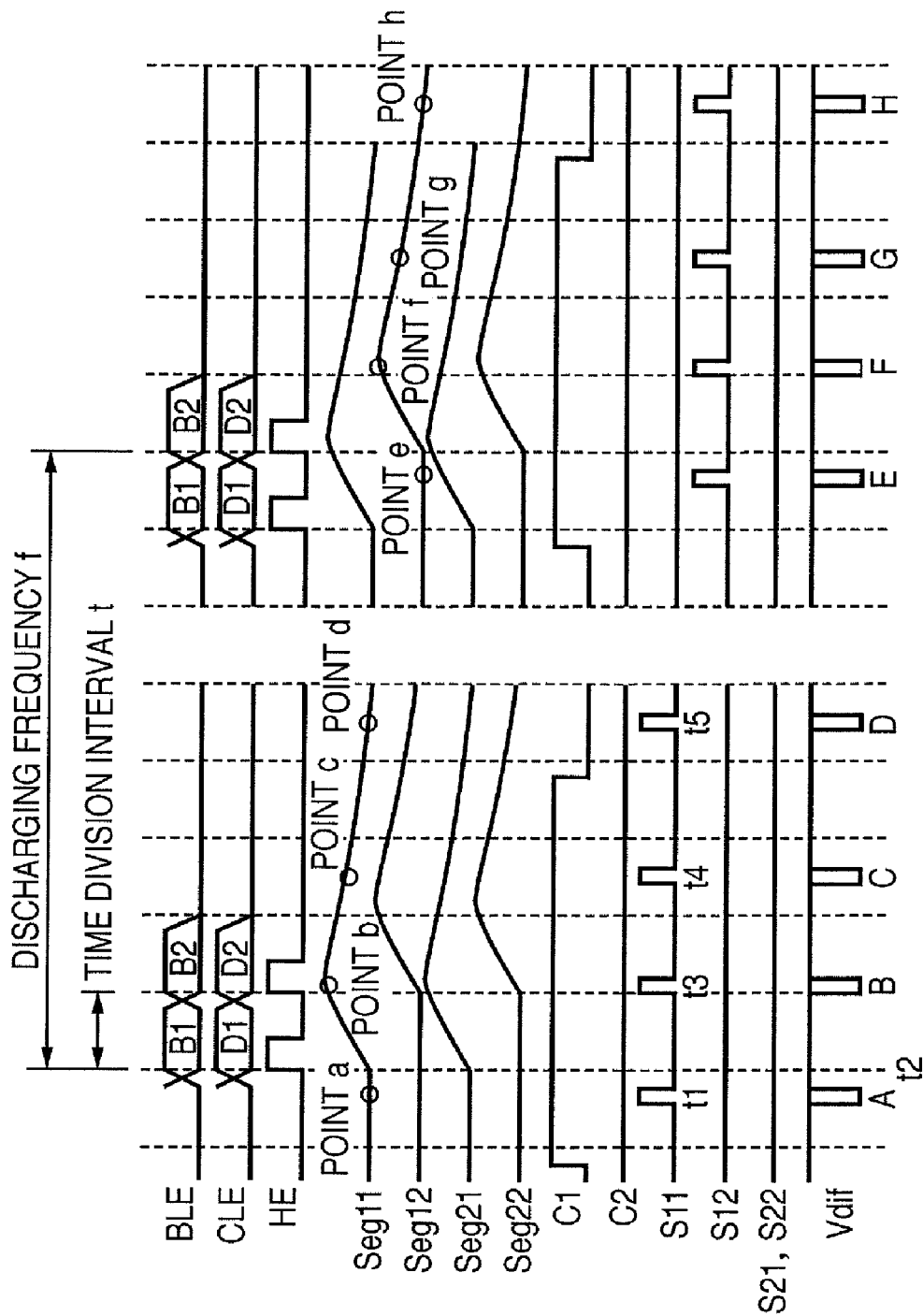
FIG. 13 is a chart illustrating the timing of heater driving and temperature detection operations.

FIG. 13 is a diagram illustrating an example of the timing of heater driving and temperature detection operations carried out with the help of the temperature detection circuits of the present embodiment. There are four heaters provided here, as shown in FIG. 11, and driving is carried out using a matrix of 2 columns×2 rows. BLE denotes a column signal for selecting columns, CLE is a row signal for selecting rows, and HE is a signal applied to the selected heater. Time division driving is performed by controlling these signals BLE, CLE, and HE using a time interval t and an discharge frequency f. Then, the detection signals obtained by the four temperature detection elements seg11 to seg22 corresponding to the heaters show temperature waveforms (detection voltage waveforms) that accompany voltage application to the heaters.

As a specific example, explanations will be provided regarding a case, in which detection is carried out at 4 points using a time interval t (2 µs) and an discharge frequency f (12 kHz), with the applied pulse width of HE set to 0.8 µs, in the same manner as in FIG. 10. Here, explanations are provided for a case of temperature detection carried out using the temperature detection element seg11.

First of all, the signal C1 is turned ON and the signal S11 is turned ON at time t1, which is 1 µs earlier than time t2, and a temperature detection voltage $V_{dif}(A)$ at the initial temperature point (a) is read out. Next, the signal HE is turned ON at time t2 and the signal S11 is then turned ON 2 µs later, at time t3, and a temperature detection voltage $V_{dif}(B)$ at the point of the maximum temperature (b) is read out. Next, at time t4, which is 5 µs later, the signal S11 is turned ON and a temperature detection voltage $V_{dif}(C)$ at the pre-refill point (c) is read out. Furthermore, at time t5, which is 9 µs later, the signal S11 is turned ON and a temperature detection voltage $V_{dif}(D)$ at the refill point (d) is read out. A total of six time division periods are required for temperature detection at these four points. Next, speaking of temperature detection by the temperature detection element seg12, after an discharge period of 83.3 µs, the temperature detection element seg12 is selected and, as described above, temperature is read out at the same four points in time, this time by controlling the signal S12. In addition, measurements can be performed in the same manner also in case of the temperature detection elements seg21, seg22 of the temperature detection element group 152. Thus, by selectively reading out a voltage generated by the temperature detection element in synchronization with voltage application to each heater, it is possible to detect the temperature variation that accompanies driving of the heater due to the voltage application.

In a printer printing with line heads having a longitudinal length of A4 at a resolution of 1200 dpi, using the timing illustrated in FIG. 13, when the number of lines per page is about 10,000 and the number of time-division periods is set to 24, temperature detection can be carried out by four temperature detection elements per line. This allows for 40,000 measurements to be performed per page. In a case that the number of nozzles per chip is 800, there can be 50 instances of temperature detection per nozzle. Now, assuming that the printing duty cycle is 20%, on the average, per page, non-discharge detection can be performed 10 times per nozzle.

Using the circuitry of the first embodiment in this manner makes it possible to selectively read out the temperature-dependent voltage (temperature) generated by each temperature detection element by applying constant current bias to the temperature detection element, connecting one of the terminals of the temperature detection elements to a common wire, and providing an analog switch at the other terminal of each of the temperature detection elements. Furthermore, the temperature condition of a given heater can be accurately detected by providing the buffer amplifiers between the temperature detection element group and the differential amplifier 153 and amplifying the weak voltage to conduct a differential amplification.

Second Exemplary Embodiment

Figure 14:
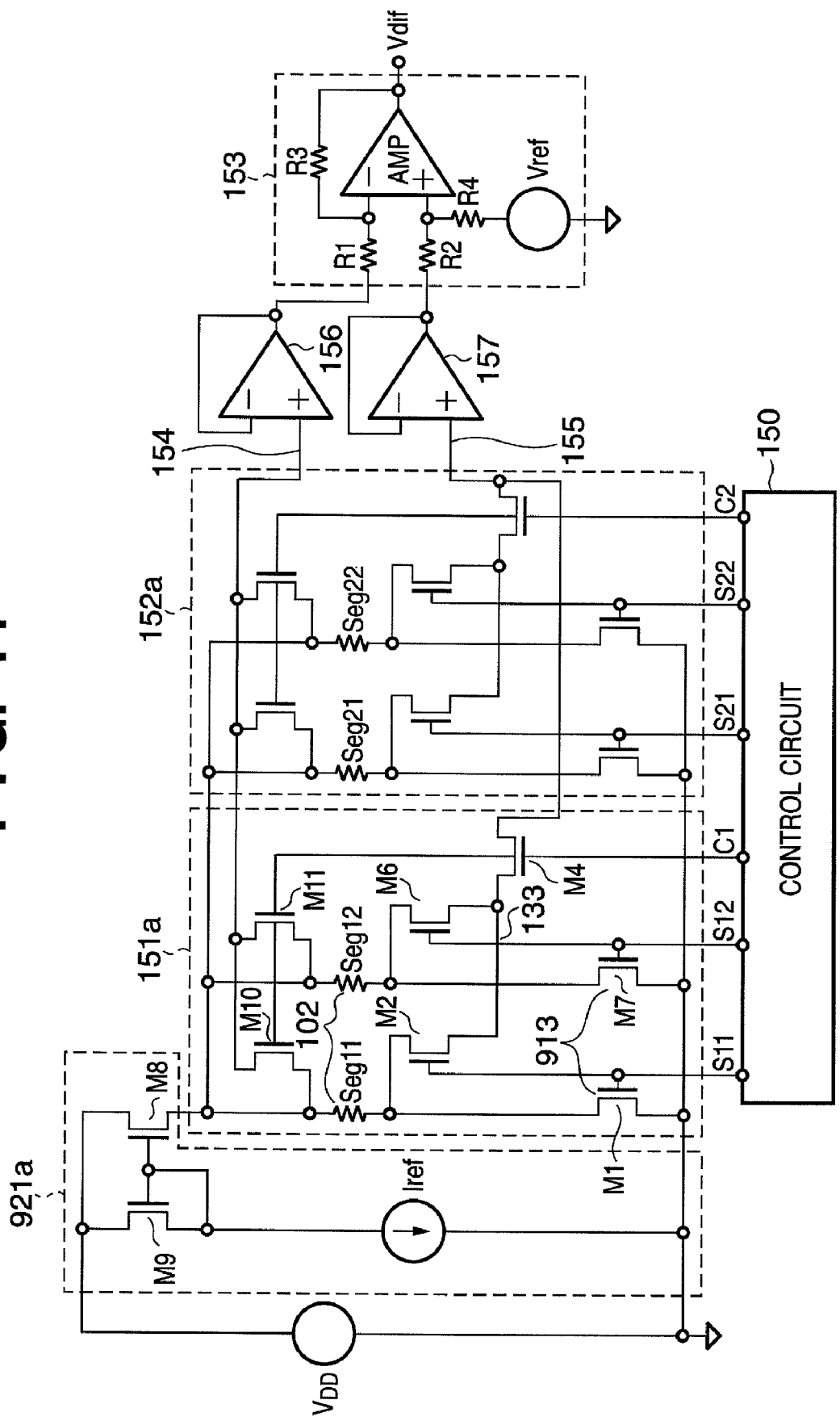
FIG. 14 is a circuit diagram showing an example configuration of a non-discharge detection circuit used in a second exemplary embodiment of the present invention.

FIG. 14 is a circuit diagram illustrating the configuration of a non-discharge detection circuit of the second embodiment of the present invention, with parts common with the previously described FIG. 6 and FIG. 11 designated by the same reference numerals.

A temperature detection element group 151a includes thin-film resistors seg11 and seg12, which operate as temperature detection elements 102, and MOS transistors M1, M7, which turn the temperature detection elements ON and OFF. In addition, it includes MOS transistors M10, M11 operating as analog switches separately connected to one of the terminals of the temperature detection elements seg11, seg12, and MOS transistors M2, M6 operating as analog switches provided separately at the other terminals of the temperature detection elements seg11, seg12. Furthermore, it includes a common wire 133, which connects to the outputs of the analog switches M2, M6, and an analog switch M4, which is connected to the common wire 133. In the same manner as in FIG. 11, in the example illustrated herein, the temperature detection element groups respectively have two temperature detection elements. It should be noted that a temperature detection element group 152a also has the same configuration.

A reference current source 921a, which includes a constant current source $I_{ref}$ and an MOS transistor M9 driving the constant current source $I_{ref}$, and an MOS transistor M8 that forms a current mirror in conjunction with this transistor M9 and supplies a constant electric current to the temperature detection element groups. The control circuit 150 generates a signal S11 that turns the switching elements M1, M2 ON and OFF, a signal S12 that turns M6 and M7 ON and OFF, and a signal C1 that turns M10, M11, and M4 ON and OFF. The control signals S21, S22, and C2 used for the temperature detection element group 152a are generated in the same manner. Buffer amplifiers 156 and 157 are respectively connected to wires 154 and 155 and receive an output of the selected temperature detection element with a high input impedance so as to output a differential amplifier 153. The differential amplifier 153 is connected to the outputs of the buffer amplifiers 156 and 157 and has the gain setting resistors R1, R2, R3, R4 and reference voltage $V_{ref}$.

First of all, the signal C1 turns the transistors M10, M11, and M4 ON. Subsequently, the signal S11 is used to turn the transistor M1 ON and supply a bias current to the temperature detection element seg11 by passing the constant electric current set by the reference current source 921a through the transistor M8. A temperature-dependent voltage is generated at both terminals of the temperature detection element seg11 by the resistance value of the temperature detection element seg11 corresponding to the temperature at that time and the current value of the preset bias current. This voltage is transmitted to the wires 154, 155 through the analog switches M10, M2, and M4. The differential amplifier 153 then accepts the voltage $V_{com}$ of the output of the buffer amplifier 156 and voltage $V_{seg}$ of the output of the buffer amplifier 157 as input and uses the gain setting resistors R1, R2, R3, R4 and reference voltage $V_{ref}$ to output the differential voltage $V_{dif}$. The differential voltage $V_{dif}$ is given by the formula below.

$$V_{dif} = -A(V_{com} - V_{seg}) + V_{ref}$$

It should be noted that here A=R3/R1, R1=R2, and R3=R4.

The voltages (temperatures) generated by the temperature detection element seg11 are read out in this manner. Next, in the temperature detection element seg12, in a similar manner, the signal C1 is used to turn M10, M11, and M4 ON, the signal S12 is used to turn M7 and M6 ON, and voltage generated by the temperature detection element seg12 is read out. In this manner, the temperature detection elements seg21, seg22 of the temperature detection element group 152a can be read out using the same steps. By performing matrix driving (here, a matrix with 2 columns×2 rows) in this manner, the voltages (detection temperatures) generated by the temperature detection elements can be selected using time division and read out.

In the second embodiment, the temperature detection results of the temperature detection elements are obtained in the same manner as in the previously described the first embodiment. This allows for operation to be carried out using the same temperature detection operation timing as in FIG. 12A to FIG. 13 of the previously described first embodiment.

In this manner, a temperature-dependent voltage generated by each temperature detection element can be selectively read out by applying constant current bias to each temperature detection element and providing analog switches at both terminals of each temperature detection element. Furthermore, the temperature condition of a heater can be accurately detected by amplifying the weak detection voltage to conduct a differential amplification.

As explained above, the second embodiment makes it possible to accurately detect heater driving-dependent nozzle temperature by selectively reading out the voltage generated by each temperature detection element. As a result, it becomes possible to detect inadvertent abnormal discharge based on temperature variation and, moreover, such abnormal conditions can be detected in the process of printing. In addition, the character of temperature variation can be detected as well and information can be provided to permit determination of the type of abnormal ink discharge. Providing such temperature information makes it possible to perform appropriate ink discharge recovery processing and image data processing compensating for ink non-discharge. This makes it possible to provide more reliable printed images.

Furthermore, providing driving functionality corresponding to ink discharge amount control and using the temperature information of each heater (nozzle) allows for controlling the temperature-dependent discharge amount of each nozzle and makes it possible to provide printed images of higher quality.

Third Exemplary Embodiment

Figure 15:
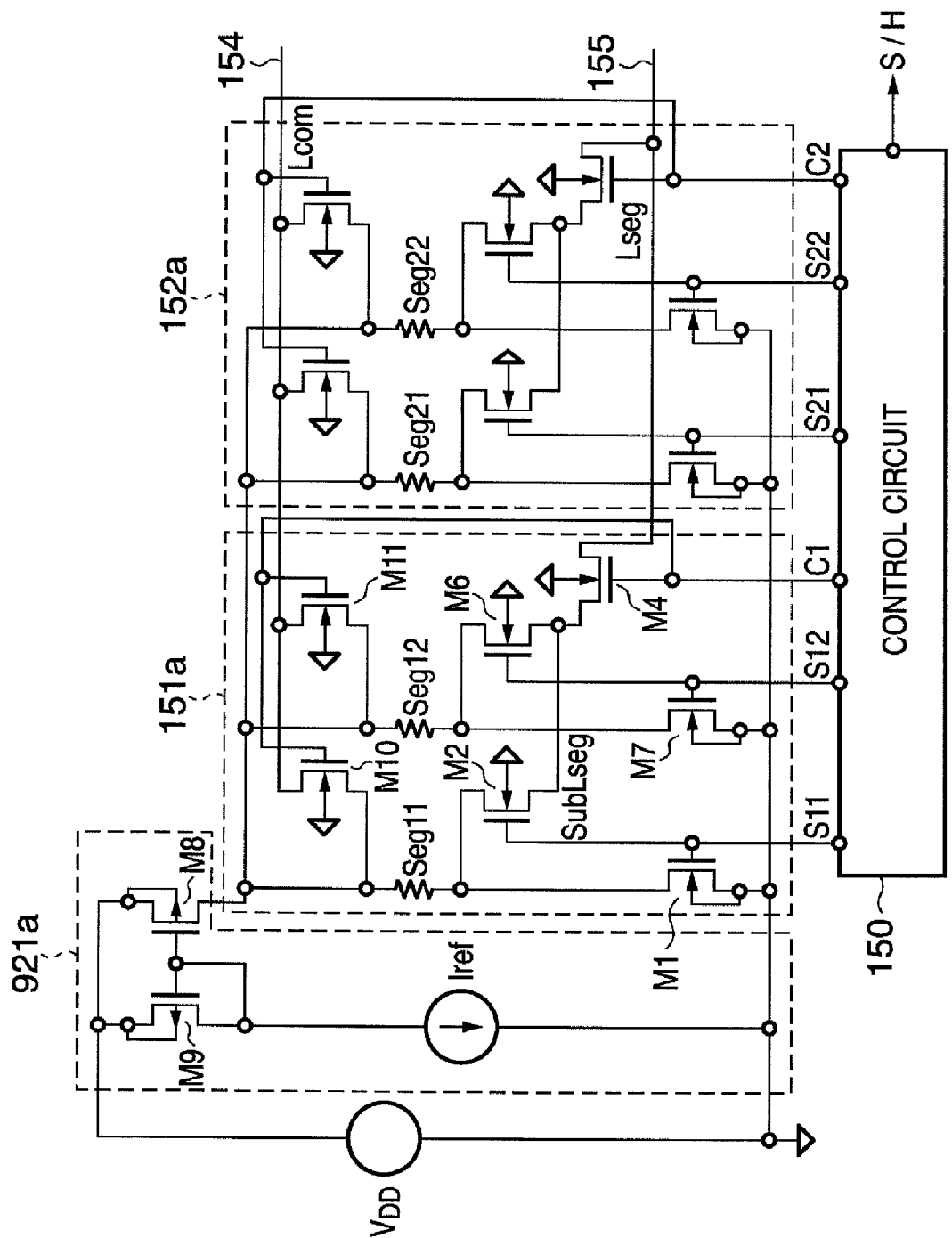
FIG. 15 is a circuit diagram showing an example configuration of a temperature detection circuit used in a third exemplary embodiment of the present invention.

The third embodiment of the present invention is explained next. FIG. 15 is a circuit diagram showing the configuration of a temperature detection circuit used in a third embodiment of the present invention.

In FIG. 15, parts common with the previously described FIG. 14 are designated by the same reference numerals and their explanation is omitted. Because the operation of the circuit of FIG. 15 is the similar to the operation of the circuit of the previously described FIG. 14, its explanation is omitted.

Figure 16:
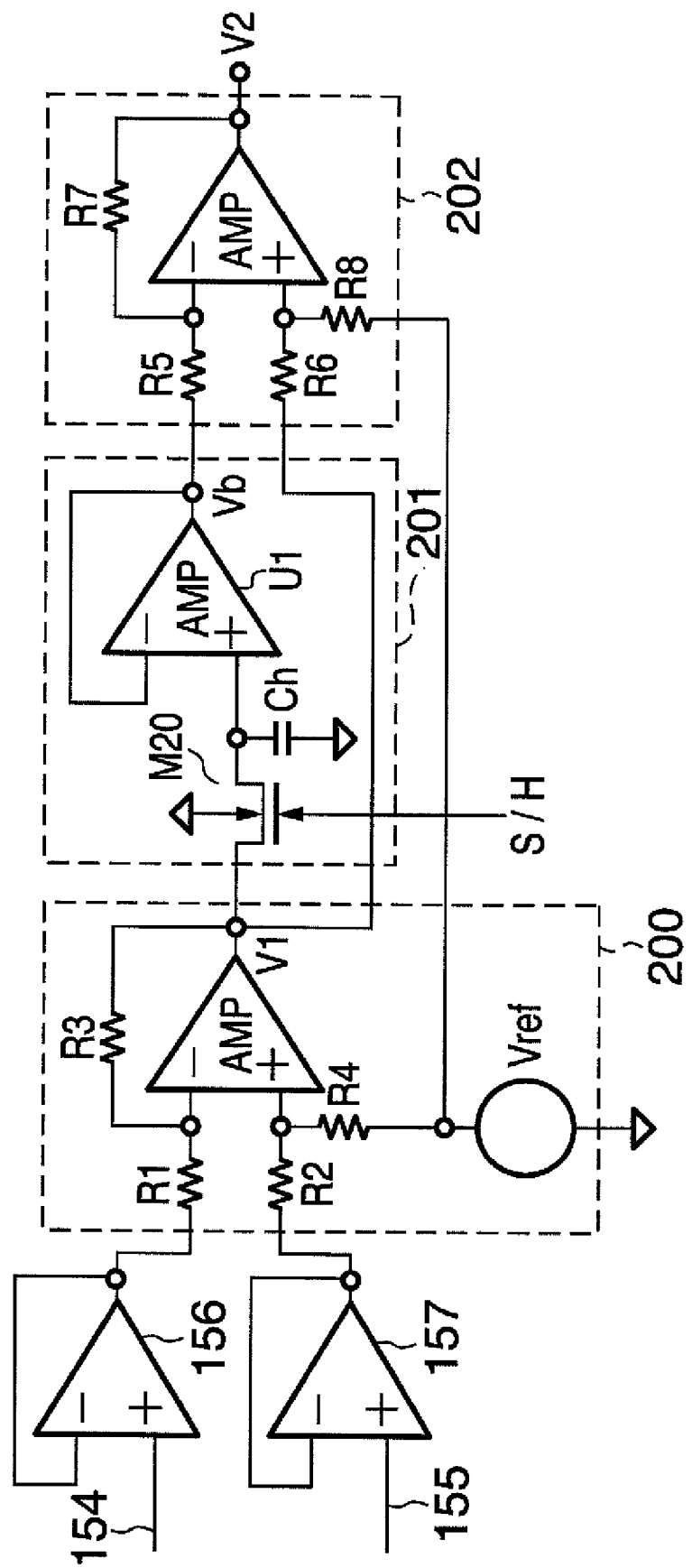
FIG. 16 is a circuit diagram showing an example configuration of a differential amplifier used in the third exemplary embodiment of the present invention.

FIG. 16 is a circuit diagram showing the configuration of a differential amplifier used in the third embodiment.

Buffer amplifiers 156 and 157 are respectively connected to wires 154 and 155 and receive an output of the selected temperature detection element with a high input impedance so as to output a differential amplifier 200. The differential amplifier 200 is connected to the outputs of the buffer amplifiers 156, 157, and has gain setting resistors R1, R2, R3, R4 and a reference voltage $V_{ref}$. A hold circuit 201 includes an MOS transistor M20, which operates as an analog switch connected to the output of the differential amplifier 200, as well as a buffer amplifier U1 and a charging capacitor Ch connected to the drain terminal of the transistor M20. Furthermore, a subsequent-stage differential amplifier 202, which is connected to the output of the differential amplifier 200, the output of the buffer amplifier U1, and reference voltage $V_{ref}$, has gain setting resistors R5, R6, R7, and R8 and a buffer amplifier.

At time t1 in FIG. 10, the control circuit 150 uses the signal C1 to turn the analog switches M10, M11, and M4 ON. Subsequently, the signal S11 is used to turn the switching element M1 ON and supplies the constant electric current (bias current) set by the reference current source 921a to the temperature detection element seg11 through the constant current source M8. Voltage is generated at both terminals of the temperature detection element seg11 in response to the resistance value of the temperature detection element seg11 corresponding to the temperature at that time, and the current value of the preset bias current. In this manner, the voltage generated in the temperature detection element seg11 is transmitted to the wires 154, 155 via the analog switches M10, M2, and M4. Therefore, the differential amplifier 200 accepts the voltage $V_{com}$ of the buffer amplifier 156 and voltage $V_{seg}$ of the buffer amplifier 157 as input. Accordingly, the differential amplifier 200 outputs a differential voltage V1 based on the gain setting resistors R1, R2, R3, R4 and reference voltage $V_{ref}$. The differential voltage V1 is given by the formula below.

$$V1(t1) = -A(V_{com} - V_{seg}) + V_{ref}$$

It should be noted that here A=R3/R1, R1=R2, and R3=R4.

On the other hand, a S/H signal (FIG. 16) is set in sampling mode using the same timing as the signal S11 and the analog switch M20 is turned ON. As a result, the capacitor Ch is charged by the voltage V1(t1). Next, prior to turning the signal S11 OFF, the S/H signal is switched to hold mode, and the analog switch M20 is turned OFF. The voltage of the capacitor Ch, which is in a hold state at the voltage of V1(t1), is outputted to the differential amplifier 202 as a base voltage $V_b$ via the buffer amplifier U1.

Subsequently, at time t3 in FIG. 10, the temperature detection element seg11 is selected as described above, a bias current is applied, and a differential voltage $V1(t3)=-A(V_{com}-V_{seg})+V_{ref}$ is generated.

The differential amplifier 202 receives the voltage V1(t3) and the sampled and held voltage V1(t1), i.e. voltage $V_b$, and outputs a differential voltage V2 based on the gain setting resistors R5, R6, R7, and R8 and reference voltage $V_{ref}$.

Here, $V2=-B(V_b-V1(t3))+V_{ref}$

It should be noted that here B=R7/R5, R5=R6, and R7=R8.

Thus, the temperature detection voltage V2(t3) corresponding to the relative change at time t3 with respect to time t1 in the temperature detection element seg11, is outputted from the differential amplifier 202. In the same manner, turning the signal S11 ON at time points t4 and t5 allows the differential amplifier 202 to output temperature detection voltages V2(t4) and V2(t5), which correspond to relative change at time t4 and time t5 with respect to time t1.

Next, in the temperature detection element seg12, the signal C1 is used to turn M10, M11, and M4 ON, the signal S12 is used to turn the transistors M7 and M6 ON, and the voltage V1(t1), for which the output voltage of the temperature detection element seg12 is the $V_b$, is held in the hold circuit. The temperature detection voltages V2(t3), V2(t4), and V2(t5), which correspond to relative change at time t3, t4, and t5 with respect to time t1, can then be outputted from the differential amplifier 202. The detected temperatures of the temperature detection elements seg21, seg22 of the temperature detection element group 152a can also be outputted in a similar manner.

By performing matrix driving (here, a matrix with 2 columns×2 rows) in this manner, a temperature signal detected by a single temperature detection element can be selected using time division and read out at a plurality of times.

Figure 17:
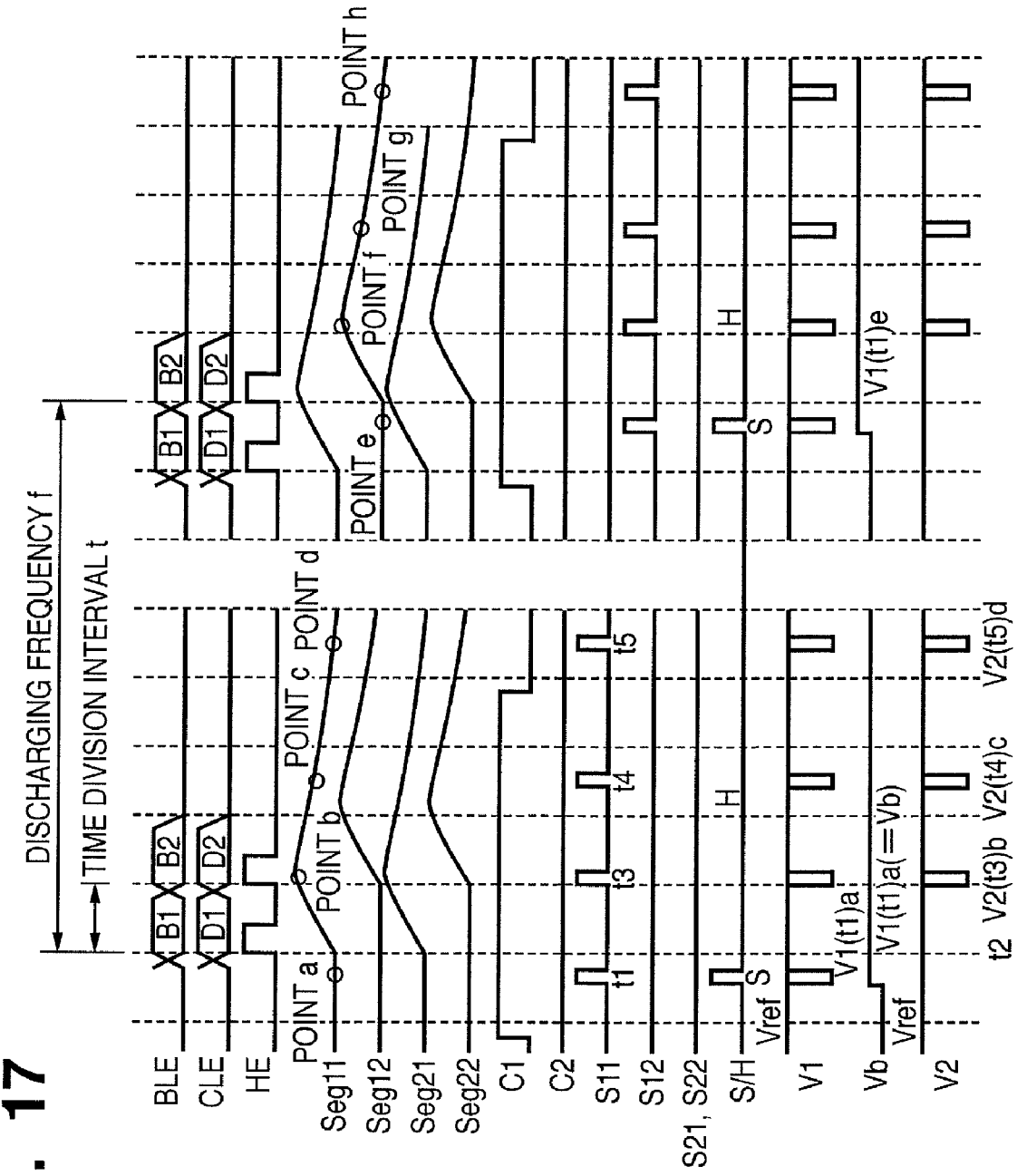
FIG. 17 is a chart illustrating the timing of heater driving and temperature detection operations in the third exemplary embodiment.

FIG. 17 is a diagram illustrating the timing of heater driving and temperature detection operations in the third embodiment. There are four heaters provided here, as shown in FIG. 15, and driving is carried out using a matrix of 2 columns×2 rows. BLE denotes a column signal for selecting columns, CLE a row signal for selecting rows, and HE is a signal applied to the selected heater. Time division driving is performed by controlling these signals BLE, CLE, and HE using the time interval t and discharge frequency f. Then, the four temperature detection elements seg11, seg12, seg21, and seg22, which are provided corresponding to the heaters, output temperature waveforms (detection voltage waveforms) that accompany voltage application to the heaters.

As a specific example, explanations will be provided regarding a case, in which detection is carried out at 4 points using a time division period t (2 µs) and an discharge frequency f (12 kHz), with the applied pulse width of HE set to 0.8 µs, in the same manner as in FIG. 10. It should be noted that here voltage $V_b$ of the temperature detection element seg11 is kept as the initial voltage $V_b$.

Here, explanations are provided for a case of temperature detection carried out using the temperature detection element seg11. Here, the signal C1 is turned ON, the signal S11 is turned ON at time t1, which is 1 µs earlier than time t2, and a temperature detection voltage V1(t1)a (=$V_b$) at the initial temperature point (a) is sampled and held. Next, the signal HE is turned ON at time t2, the signal S11 is turned ON at time t3, which is 2 µs later, and a temperature detection voltage V1(t3)b at the point of the maximum temperature (b) is received and a temperature detection voltage V2(t3)b=−B (V1(t3)b−$V_b$), which is outputted from the differential amplifier 202 and represents relative change of temperature, is read out.

Next, the signal S11 is turned ON at time t4, which is 5 µs later, a temperature detection voltage V1(t4)c at the pre-refill point (c) is received, and a temperature detection voltage V2(t4)c=−B (V1(t4)c−$V_b$), which is outputted from the differential amplifier 202 and represents relative change of temperature, is read out. Furthermore, the signal S11 is turned ON at time t5, which is 9 µs later, a temperature detection voltage V1(t5)d at the refill point (d) is received, and a temperature detection voltage V2(t5)d=−B (V1(t5)d−$V_b$), which is outputted from the differential amplifier 202 and represents relative change of temperature, is read out. A total of six time division periods are required for temperature detection at these four points. Next, as far as temperature detection by the temperature detection element seg12 is concerned, after an discharge period of 83.3 µs, the temperature detection element seg12 is selected and temperature is read out at the same four points as in the case of the previously described temperature detection element seg11. In addition, measurements can be performed in the same manner also in case of the temperature detection elements seg21, seg22 of the temperature detection element group 152a. Thus, by selectively reading out voltage generated by the temperature detection element in synchronization with voltage application to the heater, it is possible to detect the temperature variation that accompanies driving of the heater due to the voltage application.

In a printer printing with line heads having a longitudinal length of A4 at a resolution of 1200 dpi for example, using the timing illustrated in FIG. 17, when the number of lines per page is about 10,000 and the number of time-division periods is set to 24, temperature detection can be carried out by four temperature detection elements per line. This allows for 40,000 measurements to be performed per page. When the number of nozzles per chip is 800, there can be 50 instances of temperature detection per nozzle. Now, assuming that the printing duty cycle is 20%, per page, on the average, 10 instances of non-discharge detection can be performed per nozzle.

Thus, when a temperature-dependent detection voltage is selectively read out by applying constant current bias to a temperature detection element, a terminal-to-terminal voltage V1 is generated for the temperature detection element in the differential amplifier 200 and the base voltage $V_b$ of the temperature variation waveform is sampled and held in the hold circuit 201. Thus, the use of the voltages V1(t), which change with time, and voltage $V_b$, which represents the initial temperature, to generate a detection voltage V2 corresponding to the relative change in the differential amplifier 220, permits amplification of weak detection voltages and highly accurate detection of temperature conditions.

Fourth Exemplary Embodiment

Figure 18:
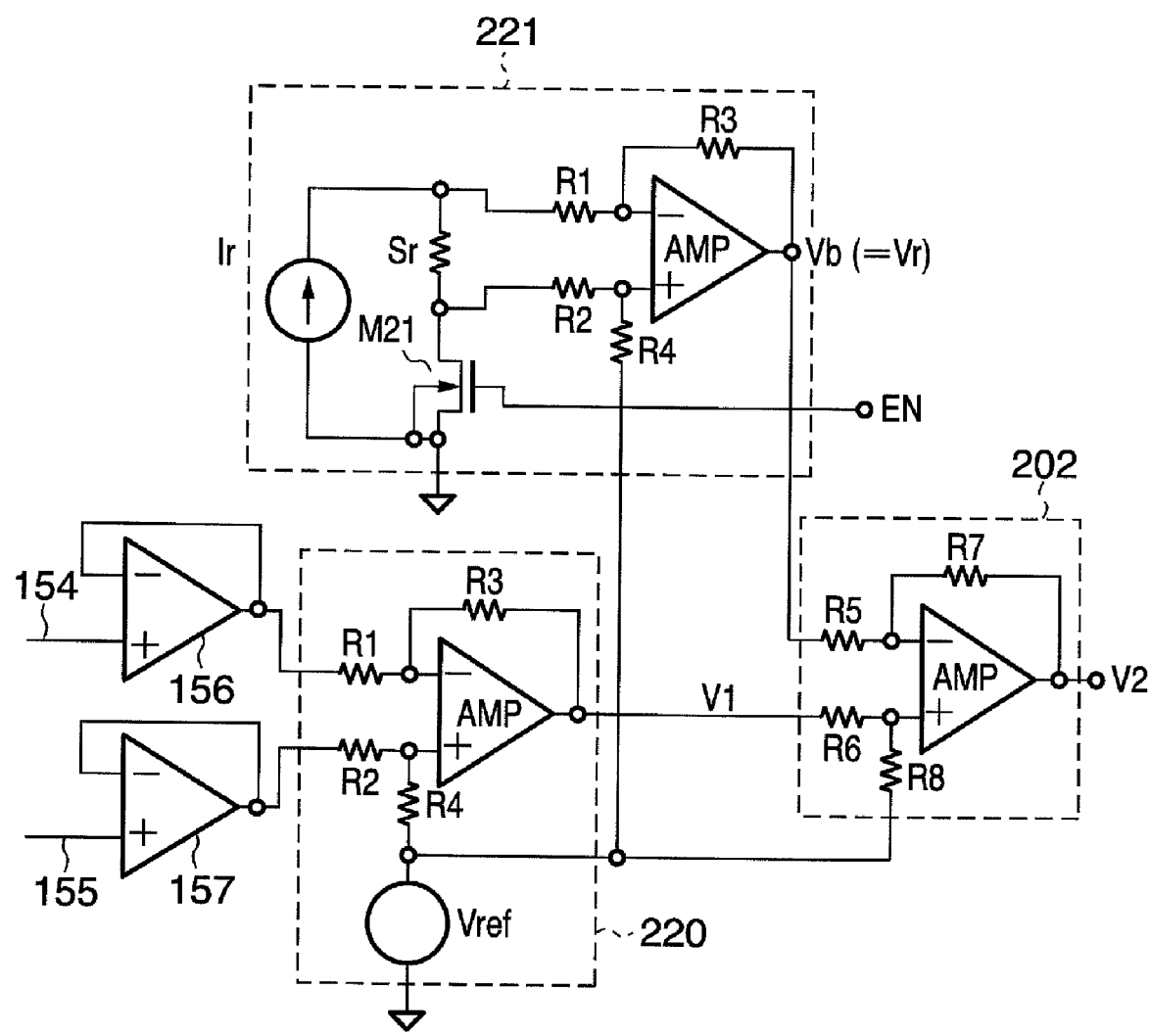
FIG. 18 is a block diagram illustrating an example configuration of a differential amplifier in a fourth embodiment of the present invention.

FIG. 18 is a block diagram illustrating the configuration of a differential amplifier in the fourth embodiment of the present invention.

In FIG. 18, buffer amplifiers 156 and 157 are respectively connected to wires 154 and 155 and receive an output of the temperature detection circuit as shown in FIG. 15 with a high input impedance so as to output a differential amplifier 220. The differential amplifier 220 is connected to the outputs of the buffer amplifiers 156 and 157 and has gain setting resistors R1, R2, R3, R4, a reference voltage $V_{ref}$ and a buffer amplifier. A reference circuit 221, which is formed on the same substrate as temperature detection element groups, has the same constant current source Ir supplying constant current as in FIG. 15 and a differential amplifier 202, such as that shown in FIG. 16. The differential amplifier 202 is connected to the output V1 of the differential amplifier 220 and to a reference differential voltage Vr, equal to the base voltage $V_b$, which is generated by the reference circuit 221.

An ON/OFF control signal EN is used to turn a MOS transistor M21 ON. The detection voltage prior to voltage application to the heater is considered to be nearly the same as the substrate temperature, such that, for example, if the substrate temperature is 25° C., the same reference differential voltage Vr ($=V_b$) as the differential voltage V1 (25° C.) at such time is outputted. In this state, at time t1 in FIG. 10, the voltage differential amplifier 220 receives the voltage $V_{com}$ of the output of the buffer amplifier 156 and voltage $V_{seg}$ of the output of the buffer amplifier 157 and uses the gain setting resistors R1, R2, R3, R4 and reference voltage $V_{ref}$ to output a differential voltage V1(t1).

$$V1(t1) = -A(V_{com} - V_{seg}) + V_{ref}$$

It should be noted that here A=R3/R1, R1=R2, and R3=R4.

The differential amplifier 202 receives the differential voltage V1(t1) and base voltage $V_b$ from the reference circuit 221 and uses the gain setting resistors R5, R6, R7, R8 and reference voltage $V_{ref}$ to output the differential voltage V2 shown below.

$$V2 = -B(V_b - V1(t1)) + V_{ref}$$

It should be noted that here B=R7/R5, R5=R6, and R7=R8.

Thus, a temperature detection voltage V2(t1) corresponding to the relative change at time t1 with respect to the voltage $V_b$ of the temperature detection element seg11, is read out. In a similar manner, detection voltages V2(t3), V2(t4), and V2(t5), which correspond to relative change at times t3, t4, and t5 with respect to the voltage $V_b$, are read out by turning the signal S11 ON at times t3, t4, and t5.

Figure 19:
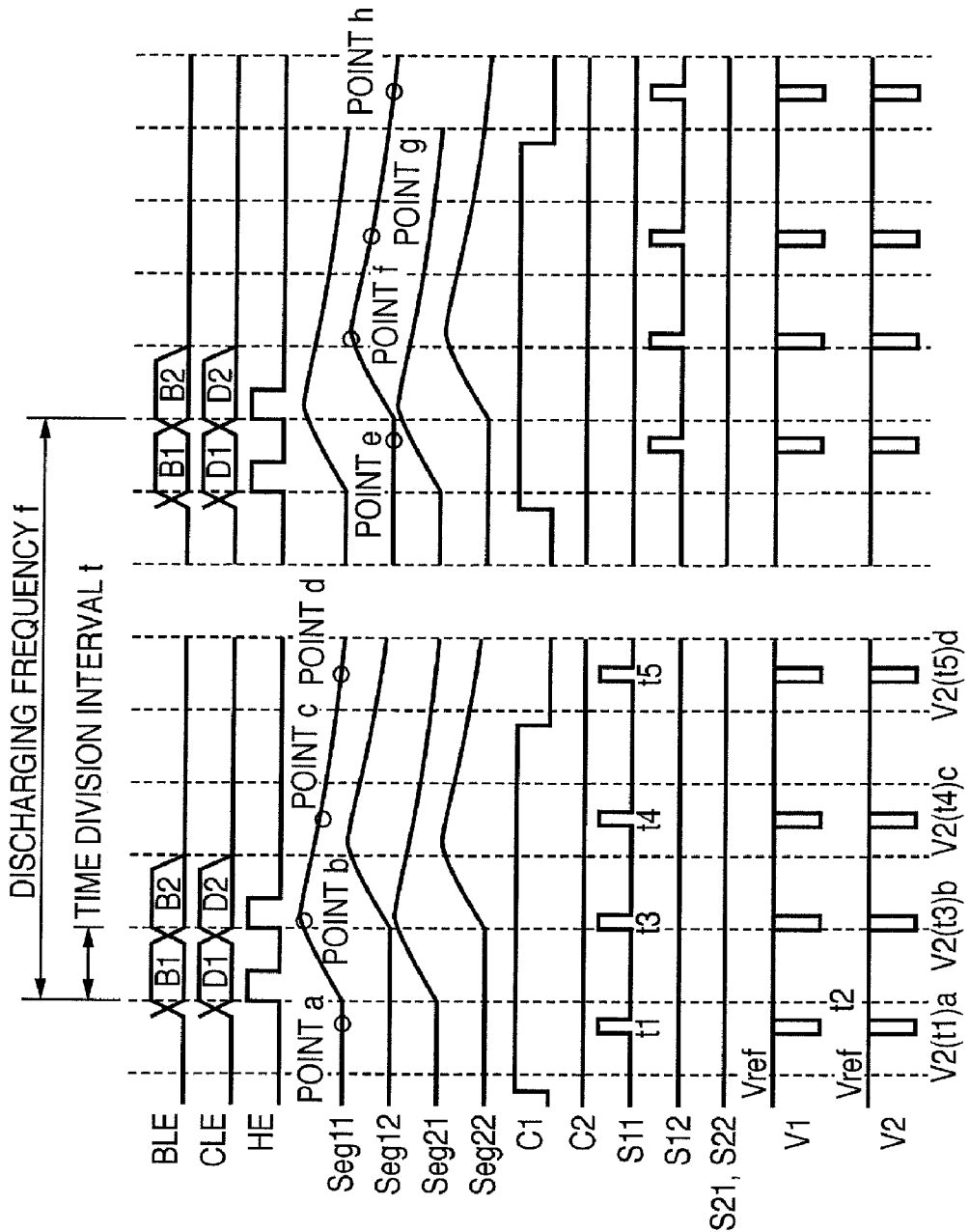
FIG. 19 is a chart illustrating the timing of heater driving and temperature detection operations in the fourth exemplary embodiment.

FIG. 19 is a diagram illustrating the timing of heater driving and temperature detection operations in the fourth embodiment. There are four heaters provided here, as shown in FIG. 15, and matrix driving is performed using a matrix of 2 columns×2 rows. BLE denotes a column signal for selecting columns, CLE a row signal for selecting rows, and HE is a signal applied to the selected heater. Time division driving is performed by controlling these signals BLE, CLE, and HE using the time interval t and discharge frequency f. Then, the four temperature detection elements seg11, seg12, seg21, and seg22, which are provided corresponding to the heaters, output temperature waveforms (voltage waveforms) that accompany the application of voltage to the heaters.

As a specific example, explanations will be provided regarding a case, in which detection is carried out at 4 points using a time division period t (2 μs) and an discharge frequency f (12 kHz), with the applied pulse width of HE set to 0.8 μs, in the same manner as in FIG. 10.

Here, explanations are provided for a case of temperature detection carried out using the temperature detection element seg11. First of all, the signal C1 is turned ON and the signal S11 is turned ON at time t1, which is 1 μs earlier than time t2, and a temperature detection voltage V2(t1)a at the initial temperature point (a) is read out. Next, the signal HE is turned ON at time t2, the signal S11 is turned ON at time t3, which is 2 μs later, and a temperature detection voltage V2(t3)b at the point of the maximum temperature (b) is read out. Next, at time t4, which is 5 μs later, the signal S11 is turned ON and a temperature detection voltage V2(t4)c at the pre-refill point (c) is read out. Furthermore, at time t5, which is 9 μs later, the signal S11 is turned ON and a temperature detection voltage V2(t5)d at the refill point (d) is read out. A total of six time division periods are required for temperature detection at these four points. Next, as far as temperature detection by the temperature detection element seg12 is concerned, after an discharge period of 83.3 μs, the temperature detection element seg12 is selected and readout is performed at the same four points. In addition, measurements can be performed in the same manner also in case of the temperature detection elements seg21, seg22 of the temperature detection element group 152a. Thus, by selectively reading out a voltage generated by the temperature detection element in synchronization with the application of voltage to the heater, it is possible to detect the temperature variation that accompanies driving of the heater due to the voltage application.

In this manner, a temperature-dependent temperature detection voltage is selectively read out by applying a constant current bias to the temperature detection element and the reference voltage Vr generated in the reference circuit 221 is regarded as the temperature detection voltage for the period prior to the application of voltage to the heater. Thus, the reference voltage Vr is used as the base voltage $V_b$ and the detection voltage V2 corresponding to the relative change is generated in the differential amplifier 202 by receiving the voltage value V1(t), which changes with time, and the base voltage $V_b$. By doing so, it becomes possible to amplify weak temperature detection voltages and detect temperature conditions in a highly accurate manner.

Fifth Exemplary Embodiment

Figure 20:
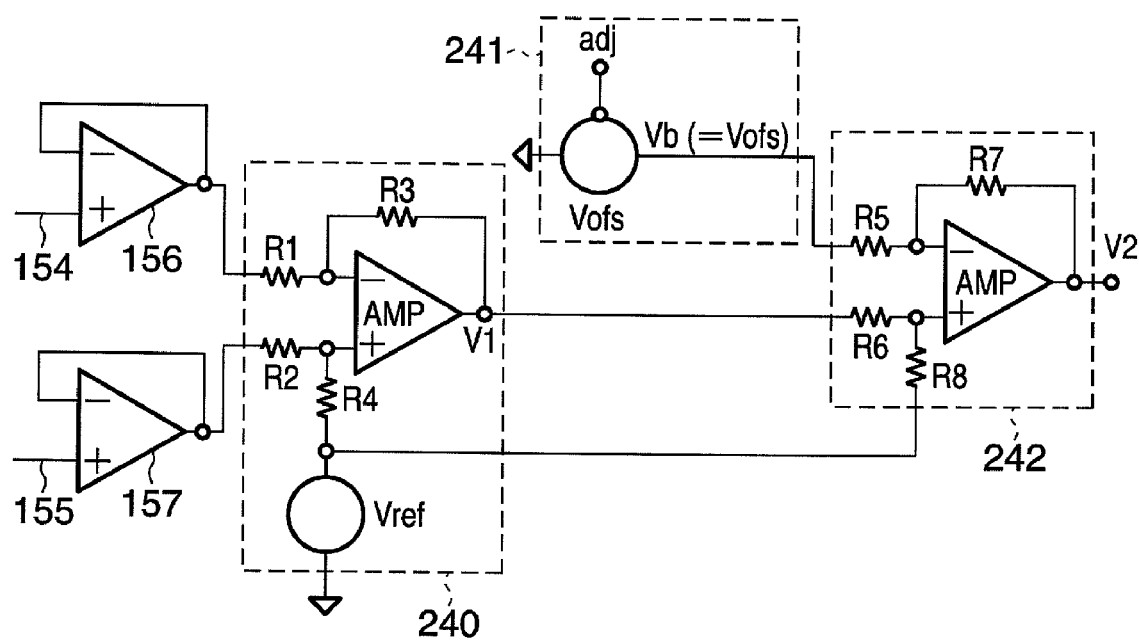
FIG. 20 is a block diagram illustrating an example configuration of a differential amplifier in a fifth exemplary embodiment of the present invention.

FIG. 20 is a block diagram illustrating the configuration of a differential amplifier in the fifth embodiment of the present invention.

In FIG. 20, buffer amplifiers 156 and 157 are respectively connected to wires 154 and 155 and receive an output of the temperature detection circuit as shown in FIG. 15 with a high input impedance so as to output a differential amplifier 240. The differential amplifier 240 has gain setting resistors R1, R2, R3, R4, a reference voltage $V_{ref}$ and a buffer amplifier. An offset voltage generator circuit 241 has a voltage source $V_{ofs}$ which, based on a voltage-setting signal adj, generates an offset voltage serving as the base voltage $V_b$. A differential amplifier 242, which is connected to the output of the differential amplifier 240, the voltage source $V_{ofs}$, and the reference voltage $V_{ref}$ is composed of gain setting resistors R5, R6, R7, R8 and a buffer amplifier.

The base voltage $V_b$, which corresponds to the detection voltage of the period prior to the application of voltage to the heater, is set via the voltage-setting signal adj. Here, the differential voltage V1 at the substrate temperature of the period prior to the application of voltage to the heater, e.g. at 25° C., is V1(25° C.)=$V_b$. Under these settings, at time t1 in FIG. 10, the voltage differential amplifier 240 receives the voltage $V_{com}$ of the output of the buffer amplifier 156 and voltage $V_{seg}$ of the output of the buffer amplifier 157 and uses the gain setting resistors R1, R2, R3, R4 and reference voltage $V_{ref}$ to generate a differential voltage V1(t1).

$$V1(t1) = -A(V_{com} - V_{seg}) + V_{ref}$$

It should be noted that here A=R3/R1, R1=R2, and R3=R4.

The differential amplifier 242 receives the differential voltage V1(t1) and base voltage $V_b$(V1(25° C.)) and outputs a differential voltage V2 based on the gain setting resistors R5, R6, R7, and R8 and reference voltage $V_{ref}$.

$$V2 = -B(V_b - V1(t1)) + V_{ref}$$

It should be noted that here B=R7/R5, R5=R6, and R7=R8.

Thus, a temperature detection voltage V2(t1), which corresponds to relative change at time t1 with respect to the base voltage $V_b$ of the temperature detection element seg11, is read out. In a similar manner, temperature detection voltages V2(t3), V2(t4), and V2(t5), which correspond to relative change at times t3, t4, and t5 with respect to the base voltage $V_b$, are read out by turning the signal S11 ON at times t3, t4, and t5. Specific examples thereof are the same as those provided in the explanations of the previously described fourth embodiment.

In this manner, a temperature-dependent detection voltage is selectively read out by applying constant current bias to the temperature detection element. At such time, the differential voltage V1 obtained at the substrate temperature of the period prior to the application of voltage to the heater is used as the $V_b$, a terminal-to-terminal voltage V1 is generated for the temperature detection element in the differential amplifier 240, and, based on the voltage V1 and base voltage $V_b$, a temperature detection voltage V2 corresponding to the relative change of temperature is generated in the differential amplifier 242. As a result, weak detection voltages can be amplified and temperature conditions can be detected in a highly accurate manner.

Sixth Exemplary Embodiment

Figure 21:
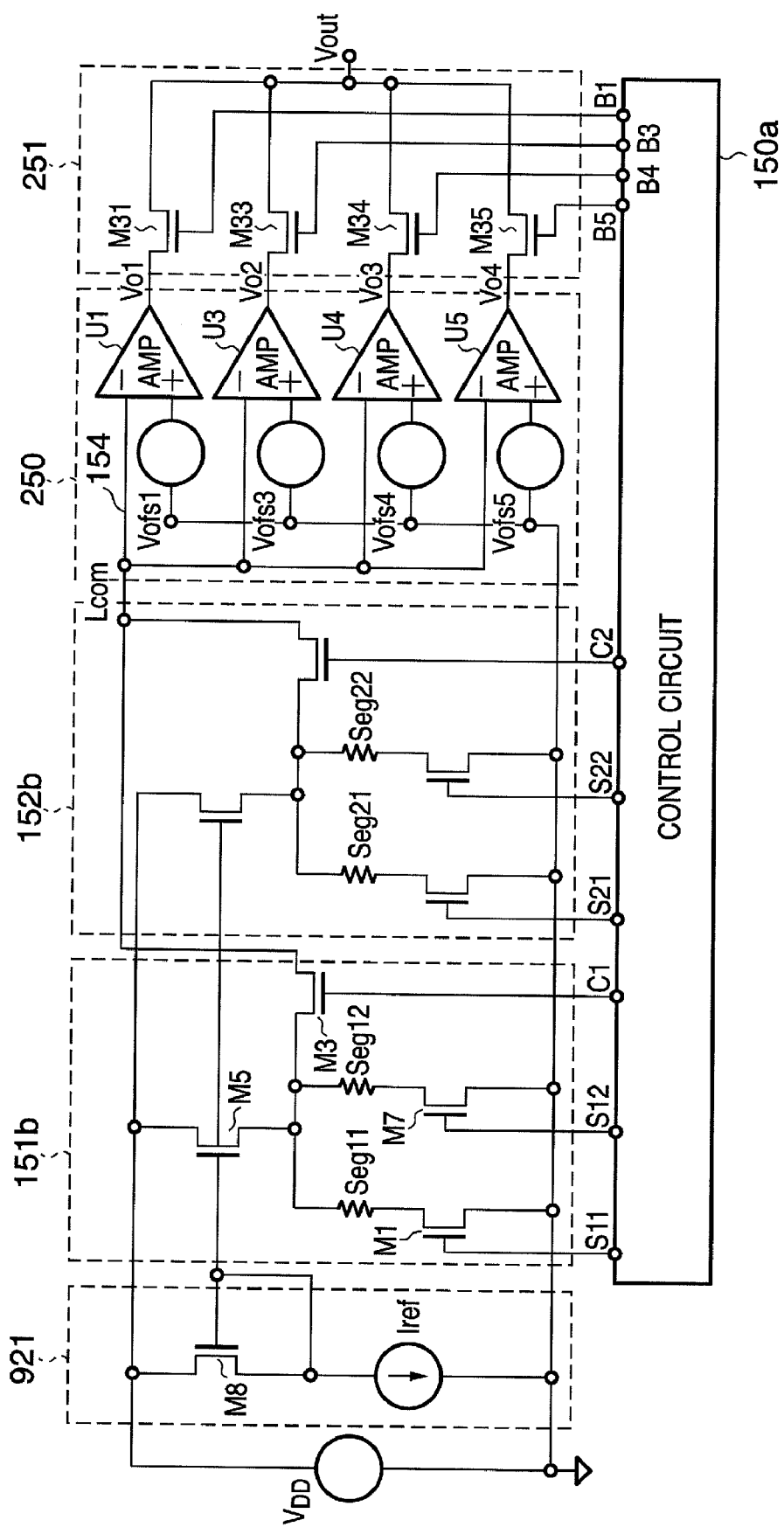
FIG. 21 is a circuit diagram showing an example configuration of a temperature detection circuit in a sixth exemplary embodiment of the present invention.

FIG. 21 is a circuit diagram illustrating the configuration of the temperature detection circuit of the sixth embodiment of the present invention, with parts common with the previously described FIG. 11 designated by the same reference numerals.

A temperature detection element group 151b includes thin-film resistors seg11 and seg12, which operate as temperature detection elements 102, MOS transistors M1, M7, which turn the temperature detection elements ON and OFF, and a transistor M5 supplying a constant electric current to the temperature detection elements. Moreover, there is an analog switch transistor M3 connected to one of the terminals of these temperature detection elements seg11 and seg12. To simplify explanation herein, two temperature detection elements are arranged in a single temperature detection element group. A temperature detection element group 152b has the same configuration.

The output of the analog switch M3 is connected to a common wire 154 and to a next-stage amplifier circuit 250. The reference current source 921 has a constant current source $I_{ref}$, and an MOS transistor M8 which, along with driving the constant current source, forms a current mirror in conjunction with a transistor M5 of the temperature detection element groups 151b, 152b. A control circuit 150a generates a signal S11 that turns the switching element M1 ON and OFF, a signal S12 that turns the switching element M7 ON and OFF, and a signal C1 that turns the analog switch M3 ON and OFF. The control signals S21, S22, and C2 are supplied to the temperature detection element group 152b in the same manner. The amplifier circuit 250 has four amplifiers U1, U3, U4, and U5 with respective amplification factors of A1, A3, A4, and A5, and offset voltage sources $V_{ofs}1$, $V_{ofs}3$, $V_{ofs}4$, and $V_{ofs}5$ corresponding to the respective amplifiers U1, U3, U4, and U5. In response to control signals B1, B3, B4, and B5 from the control circuit 150a, the selection circuit 251, which is a 4-to-1 analog multiplexer, turns the corresponding transistors M31, M33, M34, and M35 ON, thereby selecting the outputs of the amplifiers U1, U3, U4, and U5 and outputting the voltages as $V_{out}$. It should be noted that the respective suffix numbers 1, 3, 4, and 5 used herein match the suffix numbers of the time points t1, t3, t4, and t5 examined in the previously described FIG. 10.

First of all, the signal C1 is used to turn the analog switch M3 ON. Subsequently, the signal S11 is used to turn the transistor M1 ON to apply a constant current to the temperature detection element seg11 by passing the constant current set by the reference current source 921 through the switch M5. A voltage is generated between one of the terminals of the temperature detection element seg11 and GND by (the resistance value of the temperature detection element seg11+ the on-resistance of the element M1) corresponding to the temperature at that time and the preset bias current. This voltage is supplied through the analog switch M3 to the wire 154 as detection voltage $V_{com}$. The amplifier circuit 250 then accepts the voltage $V_{com}$ of the wire 154 as input and feeds gain A and offset voltage $V_{ofs}$ to each of the four amplifiers U1, U3, U4, and U5. Here, the output Vo of each amplifier U1, U3, U4, and U5 will be:

$$Vo = A(V_{com} - V_{ofs}) + V_{ofs}.$$

It should be noted that when the outputs are Voi (i=1, 3, 4, 5), $V_{ofs}$ represents the offset voltage value corresponding to each amplifier.

This is a voltage obtained by amplifying the differential voltage based on $V_{ofs}$. These four Vo values are then received as input by the selection circuit 251 and a single voltage value Vo is selected in response to the control signals B1, B3, B4, and B5 and outputted as a temperature detection voltage $V_{out}$.

Here, explanations will be provided regarding the offset voltage setting method and gain setting method used by the amplifier circuit 250.

Figure 22:
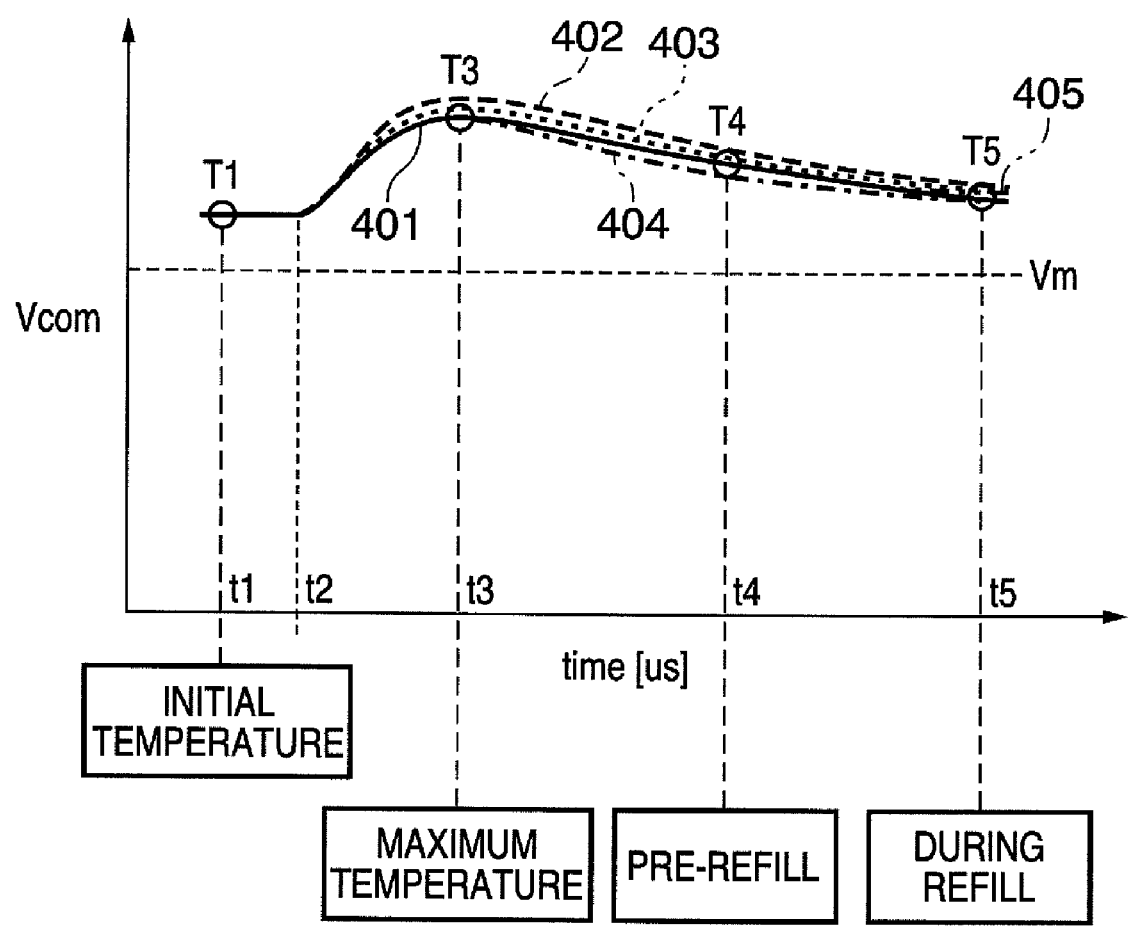
FIG. 22 is a diagram showing a temperature detection voltage $V_{com}$ used in the configuration of the sixth embodiment, based on the temperature profiles illustrated in FIG. 14.

FIG. 22 shows the temperature detection voltage $V_{com}$ used in the configuration of the sixth embodiment, based on the temperature profiles illustrated in FIG. 10. In FIG. 22, Vm denotes a drop in the voltage of the on-resistance component of the switching element M1, with the voltage component of the temperature detection element 102 located between the temperature detection waveform and the Vm line. When such a temperature detection voltage waveform is used to detect temperature at four points t1, t3, t4, and t5, the magnitude of the voltage difference in case of normal discharge and in case of a non-discharge condition is different. The gain is set in accordance with the magnitude of the voltage difference at each detection time point so as to increase the voltage difference in those locations where it is small. Moreover, at the same time, the offset voltage, which serves as the reference potential for the amplification operation, is also set in accordance with the magnitude of the voltage difference at each detection time point. It should be noted that the reference numerals 401 to 405 used in the figure respectively correspond to the reference numerals 401 to 405 of the previously described FIG. 10.

For instance, when a $V_{com}1$ at time t1 is 960 mV, $V_{com}3$ at time t3 is 990 mV, $V_{com}4$ at t4 is 980 mV, and $V_{com}5$ at time t5 is 970 mV, the amplifier U1 corresponding to time t1, which is 1 μs earlier than time t2, has A1=5 and $V_{ofs}1$=905 mV. In addition, the amplifier U3 corresponding to time t3, which is 2 μs later than time t2, has A3=10 and $V_{ofs}3$=980 mV. Furthermore, the amplifier U4 corresponding to time t4, which is 5 μs later than time t2, has A4=20 and $V_{ofs}4$=970 mV. Also, the amplifier U5 corresponding to time t5, which is 9 μs later than time t2, has A5=20 and $V_{ofs}5$ set to 960 mV. In this manner, the output voltage Vo of the amplifier U1 is:

$$Vo1 = A1(V_{com}1 - V_{ofs}1) + V_{ofs}1 = 1000 \text{ mV}.$$

The outputs of the other amplifiers U3, U4, and U5 are obtained in a similar way, such that Vo3=1080 mV, Vo4=1170 mV, and Vo5=1160 mV.

The thus generated voltages corresponding to temperatures are selected by the selection circuit 251 in accordance with the timing of their detection and read out as temperature detection voltages. It should be noted that while it is not shown in the drawings, a judging functional unit, which receives the temperature detection voltages and determines whether this is a non-discharge or not, receives the temperature detection voltages $V_{out}$ and $V_{ofs}$ in sets and makes a determination about changes.

The voltages generated by the temperature detection element seg11 are read out in this manner. Detection voltages produced by the temperature detection elements seg12, seg21, and seg22 are read out using the same process. By performing matrix driving (here, a matrix with 2 columns×2 rows) in this manner, a voltage value produced by a single temperature detection element can be read out as a temperature detection voltage $V_{out}$ by the selection circuit 251 in accordance with the timing of its detection.

Thus, one of the terminals of the temperature detection elements is connected to a common wire and the output voltages of the temperature detection elements, which are biased with a constant current, can be selectively read out using analog switches.

Furthermore, weak temperature detection voltages can be detected in a highly accurate manner by selecting the outputs of the amplifiers, for which the gain and offset voltage have been set in accordance with the timing of detection and obtaining temperature detection results.

As explained above, the present embodiment allows for selectively reading out temperature-dependent voltages and detecting the temperature condition of a given heater in a highly accurate manner. Doing so makes is possible to detect an inadvertent abnormal discharge based on temperature variation. In addition, such temperature detection can be carried out in the process of printing.

Moreover, the nature of temperature variation can provide information permitting determination of the type of the abnormal discharge. Providing such temperature information allows for more appropriate head recovery processing and image processing and makes it possible to provide more reliable printed images.

Furthermore, images of a higher quality can be provided by controlling the temperature-dependent amount of discharged ink for each heater by providing driving functionality allowing for ink discharge amount control to be implemented using temperature information for each heater.

Seventh Exemplary Embodiment

Figure 23:
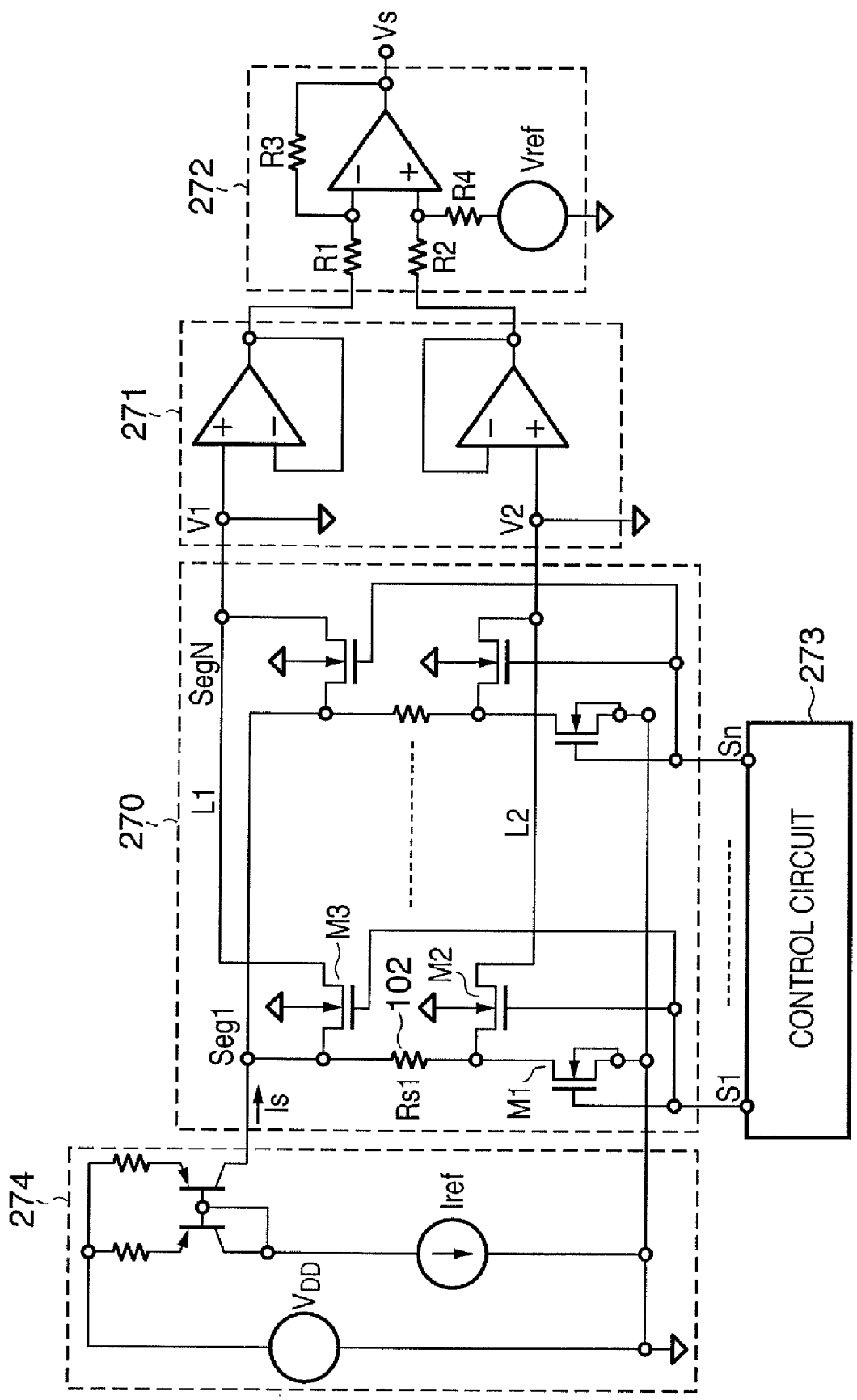
FIG. 23 is a circuit diagram showing an example configuration of a temperature detection circuit in a seventh exemplary embodiment of the present invention.

FIG. 23 is a circuit diagram showing the configuration of a temperature detection circuit in the seventh embodiment of the present invention.

A constant current source 274 is composed of a constant current source Iref and a current Is mirror circuit and supplies a constant current to a temperature detection element group 270. The temperature detection element group 270 comprises segments from Seg1 to SegN. Each segment has a temperature detection element Rs (102) made of a thin-film resistor, an MOS transistor M1 that turns the temperature detection element 102 ON and OFF, and MOS transistors M2, M3 that read out the voltages at both terminals of the temperature detection element 102. The outputs of the transistors M2, M3 of each segment are connected to common wires L1 and L2. Voltages V1 and V2 of both terminals of the temperature detection element 102 outputted to the common wires L1 and L2 are received and buffered by a buffer amplifier 271 with a high input impedance. In the same manner as the previously described differential amplifier 153, the differential amplifier 272 is composed of gain setting resistors R1, R2, R3, R4, a reference voltage $V_{ref}$ and a buffer amplifier. The differential amplifier 272 receives the output of the buffer amplifier 271 and amplifies the terminal-to-terminal voltage of the temperature detection element Rs. A control circuit 273 generates selection signals S1 to Sn for all the segments.

A selection signal S1 is used to turn the transistor M1 ON and supply the constant electric current Is to the temperature detection element Rs of the segment Seg1. Temperature-dependent terminal voltages V1, V2 are generated in the temperature detection element Rs, with the terminal voltages V1, V2 read out through read-out transistors M2, M3, which are turned on concurrently therewith. The terminal voltages V1, V2 are received as input by the differential amplifier 272 through the buffer amplifier 271, and a temperature detection voltage V is obtained by providing the reference voltage $V_{ref}$ and a gain G. The temperature detection voltage V is given by the formula below.

$$V=-G(V1-V2)+V_{ref}$$

It should be noted that here G=R3/R1, R1=R2, and R3=R4.

The temperature detection voltage of the segment Seg1 is read out in this manner. In the same manner, in a segment SegN, its temperature detection voltage is read out by selecting the segment SegN using a selection signal Sn.

FIG. 24A and FIG. 24B are diagrams showing exemplary results obtained by simulating the operation of the seventh embodiment.

FIG. 24A illustrates the terminal voltages V1 and V2. Here, V1-V2 is a temperature-dependent terminal-to-terminal voltage in a temperature detection element. At the conditions herein described, the constant current Is=3 mA, the resistance value of the temperature detection element of the segment Seg1 is set to 31.6Ω, and the resistance value of the temperature detection element of the segment SegN is set to 45Ω. FIG. 24B illustrates the reference voltage $V_{ref}$ and temperature detection voltages Vs multiplied by the gain G. At the conditions herein described, G=15, $V_{ref}$=2.4 V, and the selection period of segments Seg1 and SegN is set to 1 μs. The temperature detection voltages Vs are, respectively, 1422 mV and 2025 mV, in accordance with the expected values.

Figure 25:
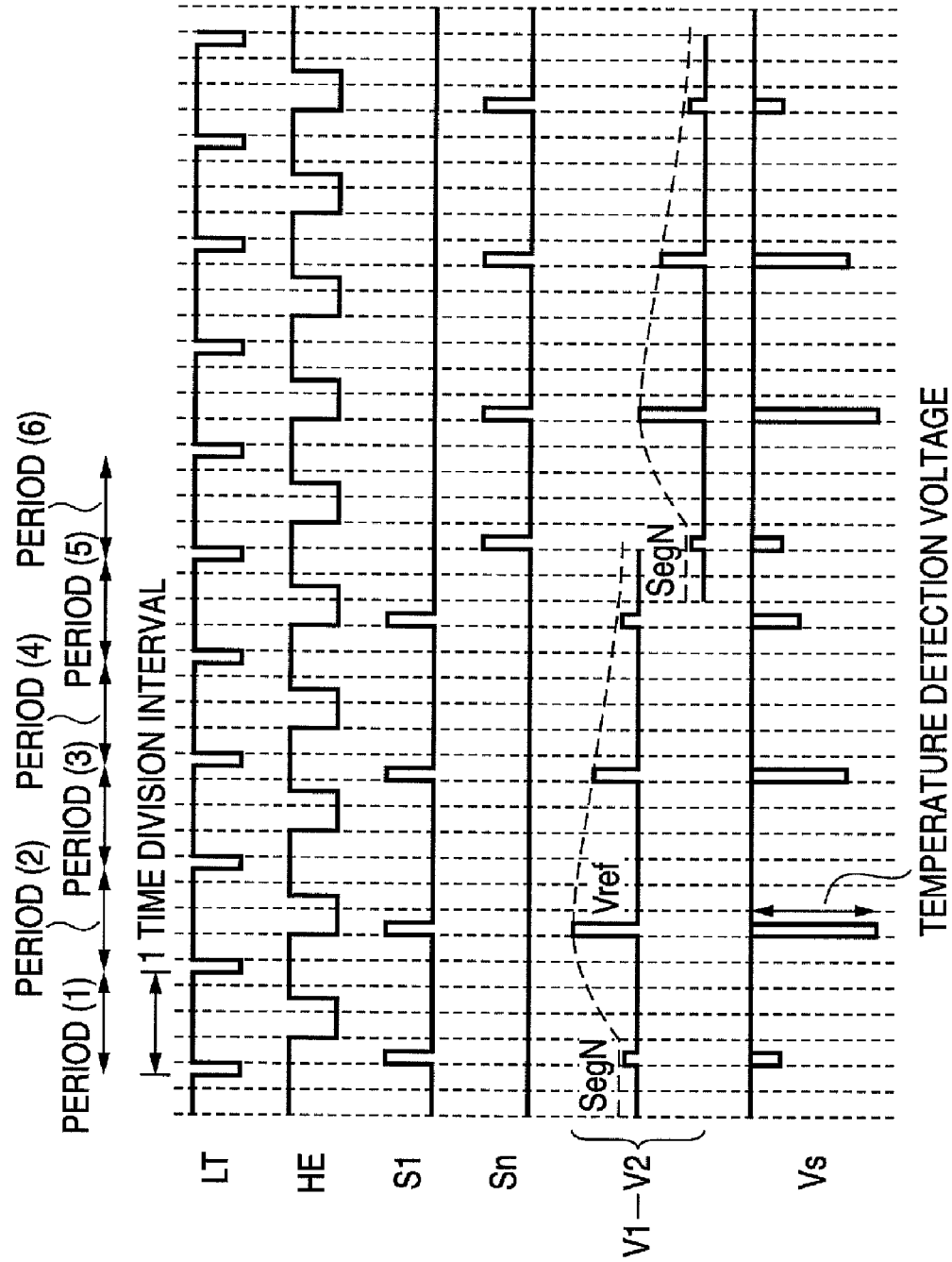
FIG. 25 is a timing chart of temperature detection operations synchronized with heater driving in the seventh exemplary embodiment.

FIG. 25 is a timing chart of temperature detection operations synchronized with heater driving in the seventh embodiment. In FIG. 25, LT, which is a latch signal used when receiving and holding data regarding the selection of temperature detection elements, is a signal synchronized with the time division driving of the heaters. HE is a pulse applied to the heaters. The signals S1 and Sn are selection signals used for the temperature detection elements illustrated in FIG. 23, outputted from the control circuit 273. Here, V1-V2 is the terminal-to-terminal voltage of a selected temperature detection element. Vs is a temperature detection voltage obtained through differential amplification by reversing the terminal-to-terminal voltage of the temperature detection element based on the reference voltage $V_{ref}$.

During period (1), a heater corresponding to the segment Seg1 is selected and an HE pulse is applied thereto. The segment Seg1 associated with the temperature detection element corresponding to this heater is selected, the signal S1 is applied using timing that is immediately prior to the HE pulse to select the segment Seg1, and the voltage generated in the selected segment is measured and outputted as a temperature detection voltage Vs. The temperature detection voltage herein provides information on temperature at time t1 illustrated in FIG. 10. Subsequently, during period (2), the segment Seg1 is continuously selected by the signal S1 and its temperature detection voltage Vs is outputted. The temperature detection voltage herein constitutes information on temperature at time t3 illustrated in FIG. 10. Likewise, during period (3) and period (5), the segment Seg1 is selected and its temperature detection voltage Vs is outputted. Temperature information corresponding to time t4 and time t5 of FIG. 10 is outputted in this manner. It should be noted that, in FIG. 25, the dotted line in (V1-V2) shows a waveform obtained on the assumption that voltage was continuously applied to the temperature detection element of the segment Seg1. After that, during period (6), a heater corresponding to the subsequent segment SegN is selected and an HE pulse is applied thereto. In order to select the segment SegN associated with the temperature detection element corresponding to this heater, the signal Sn is applied using timing that is immediately prior to the HE pulse, and the voltage generated in the segment is selected and read out, obtaining a temperature detection voltage Vs. The subsequent segments are then processed in the same manner as the segment Seg1 and temperature detection voltages are outputted by generating the signal Sn at the desired timing.

In FIG. 25, the temperature detection element of the segment Seg1 is selected continuously from period (1) to period (4). However, it is also possible to select, and read out temperature information for, different temperature detection elements in each time division period. For instance, one could randomly select temperature detection element m in period (1), temperature detection element n in period (2), temperature detection element o in period (3), temperature detection element p in period (4), etc., and output their voltages.

In this manner, it is possible to randomly select temperature detection element and read out temperature detection voltage corresponding to the temperature detected by the temperature detection element. Furthermore, the temperature condition of a given heater can be accurately detected by subjecting the weak temperature detection voltages to differential amplification.

It should be noted that from the standpoint of detection accuracy, it is desirable for the above-described first and second switches to be disposed in the vicinity of the temperature detection elements while being spaced at the spacing of the temperature detection elements.

Eighth Exemplary Embodiment

Figure 26:
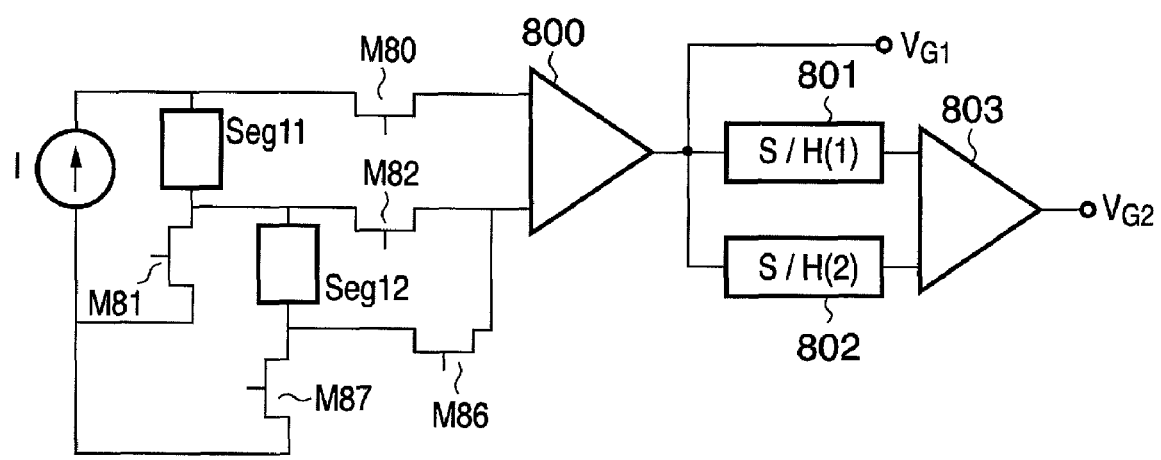
FIG. 26 is an example circuit diagram illustrating a temperature detection circuit used in an eighth exemplary embodiment of the present invention.

FIG. 26 is a circuit diagram illustrating a temperature detection circuit in the eighth embodiment of the present invention.

It shows, as described above, segments seg11, seg12 corresponding to the temperature detection elements 102 disposed in the vicinity of the heaters 104. It should be noted that while only two sensors are shown in FIG. 26 in order to simplify explanation, the actual number of the sensors corresponds to the heaters.

Transistor M81 is a transistor that turns the supply of current from the constant-current circuit I to the segment seg11 ON and OFF. Moreover, transistor M82 is a transistor that turns the supply of current from the constant-current circuit I to the segment seg12 ON and OFF. Transistor M80 is a transistor used for measuring the voltage of a common terminal connected in common to the sensors, and transistors M82, M86 are transistors used for measuring the respective voltages generated in the segments. In the same manner as in the previously described embodiments, the switching of these transistors ON and OFF is controlled by signals from a control circuit (not shown).

A differential amplifier 800, amplifies the voltages generated in the segments and outputs them as voltages VG1. Sample-and-hold (S/H) circuits 801, 802 sample and hold the output of the differential amplifier 800 using respectively different timings. A differential amplifier 803 accepts voltage values outputted from these two sample-and-hold circuits 801, 802 as input, amplifies the difference and outputs it as voltage VG2.

Figure 27:
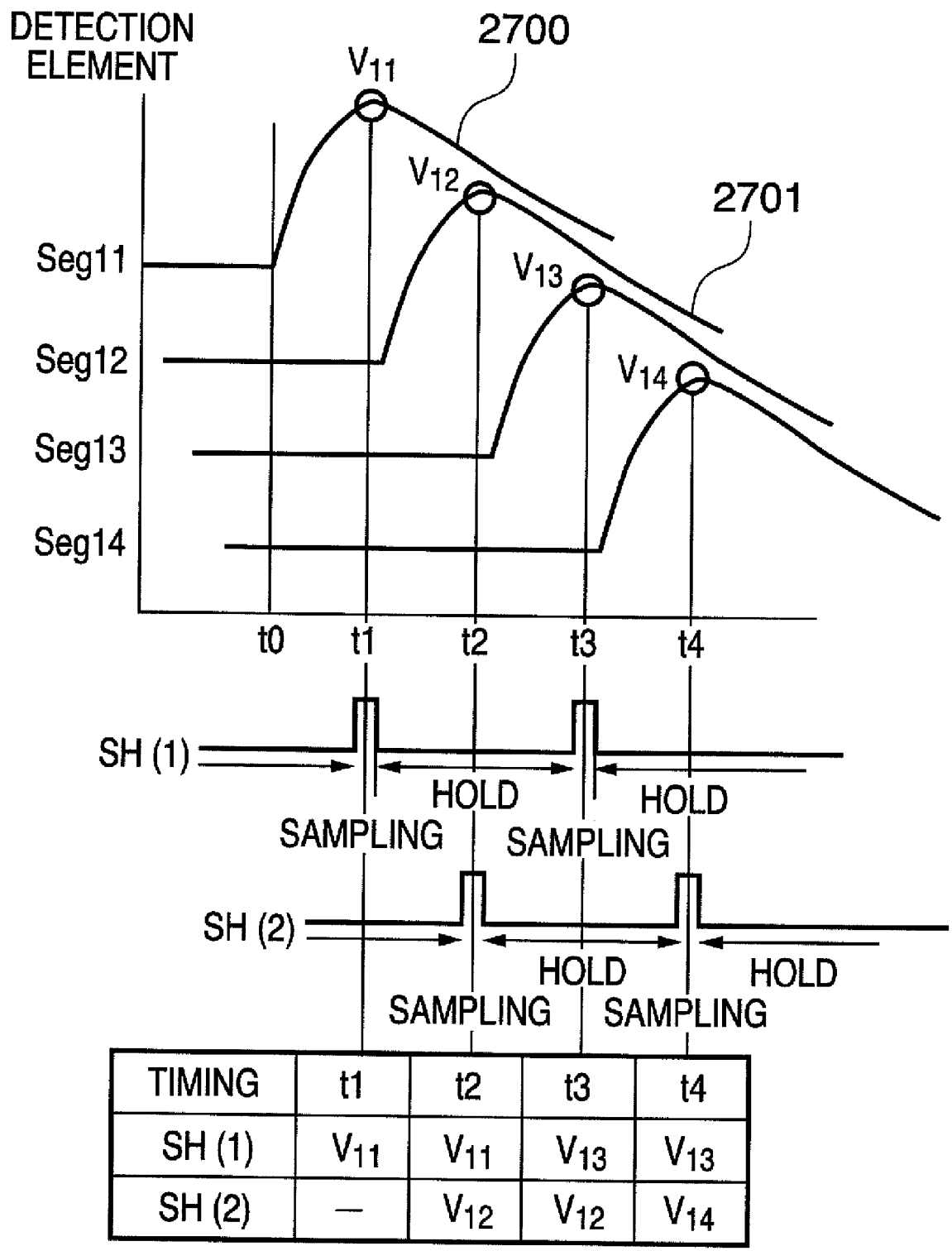
FIG. 27 is a conceptual diagram illustrating an example of temperature sampling in the eighth exemplary embodiment.

FIG. 27 is a conceptual diagram illustrating an example of temperature sampling in the eighth embodiment. It should be noted that FIG. 27 shows maximum temperature detection timing, and furthermore, additionally shows segments seg13 and seg14, which are not shown in FIG. 26. In FIG. 27, the reference numeral 2700 denotes a temperature waveform detected by the segment seg11 when current was supplied to the heater 104 corresponding to the segment seg11. Likewise, the reference numeral 2701 denotes a temperature waveform detected by the segment seg12 when current was supplied to the heater 104 corresponding to the segment seg12. The other waveforms also show respective temperature waveforms detected by the segments seg13 and seg14 when current was supplied to the heaters 104 corresponding to the segments seg13 and seg14.

Now, at time t1, a voltage value V11 generated in the segment seg11 and amplified by the differential amplifier 800 is sampled and held in the sample-and-hold (S/H) circuit 801, and, at time t2, a voltage value V12 generated in the segment seg12 and amplified by the differential amplifier 800 is sampled and held in the sample-and-hold (S/H) circuit 802. As a result, the differential amplifier 803 amplifies the difference (V11−V12) between the voltage values (temperatures) generated by the segment seg11 and segment seg12 and outputs it as VG2. Likewise, at time t3, a voltage value V13 generated in the segment seg13 and amplified by the differential amplifier 800 is sampled and held in the sample-and-hold (S/H) circuit 801, and the differential amplifier 803 amplifies the difference (V13−V12) between the voltage values (temperatures) generated by the segment seg12 and segment seg13 and outputs it as VG2. Likewise, at time t4, a voltage value V14 generated in the segment seg14 and amplified by the differential amplifier 800 is sampled and held in the sample-and-hold (S/H) circuit 802, and the differential amplifier 803 amplifies the difference (V13−V14) between the voltage values (temperatures) generated by the segment seg13 and segment seg14 and outputs it as VG2.

In this manner, ink non-discharge in each nozzle can be detected by sampling and holding voltage values corresponding to the detected temperatures and obtaining their difference every time electric current is supplied to the heaters 104.

Moreover, if the gain of the differential amplifier 800 is designated as G1 and the gain of the differential amplifier 803 is designated as G2, then the output voltage VG2 can be represented as a function of G1×G2. As a result, the comprehensive amplification factor can be increased, and, therefore, the accuracy of detection can be raised. Furthermore, because the difference between the temperatures detected by the temperature detection elements at all time points is obtained, the influence of the temperature difference dependent upon the initial temperature of the heater at all time points can be reduced. For this reason, temperature tables etc. used in the determination of the discharge state can be simplified as well.

Table 1 herein lists, for various conditions of the recording head, the maximum temperature, pre-refill temperature, and temperature during refilling in a case, wherein the gain $G1 \times G2 = 10 \times 10 = 100$, the value of resistance of the temperature detection element 102 at 25° C. is $R25=30\Omega$, the temperature coefficient TCR of the temperature detection element 102=3000 ppm/° C., and the value of the constant current I=3 mA.

TABLE 1

| Head Condition | Maximum Temperature Temperature difference/Voltage | | Pre-refill Temperature difference/Voltage | | During refill Temperature difference/Voltage | |
|---|---|---|---|---|---|---|
| Foaming-induced non-discharge | 35° C. | 945 mV. | 13° C. | 351 mV. | 9° C. | 243 mV. |
| Channel clogging | 20° C. | 540 mV. | 3° C. | 81 mV. | 7° C. | 189 mV. |
| Abnormal wettability | — | — | −12° C. | −324 mV. | — | — |
| Impurity-induced non-discharge | — | — | — | — | 7° C. | 189 mV. |

It is noted that the detection voltages are provided for a case, in which temperature resolution is 27 mV/° C. The "head condition" designates a condition due to which ink is not properly discharged. "Foam-induced non-discharge" designates a situation, in which ink is not discharged because of air bubbles. "Channel clogging" designates a condition, in which nozzles are clogged by dried ink, and "impurity-induced non-discharge" designates a condition, in which ink is not discharged because nozzles are clogged by impurities. "Abnormal wettability" designates a condition, in which ink fills nozzles and is not discharged properly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-169383, filed Jun. 19, 2006, which is hereby incorporated by reference herein in its entirety.

What is claimed is:

1. A recording head for discharging a liquid from discharge orifices by applying thermal energy from electro-thermal transducers to the liquid, the recording head comprising:
   a driving unit configured to drive by dividing a plurality of electro-thermal transducers, into a plurality of blocks and supplying electric current on a block-by-block basis based on recording data;
   each of a plurality of temperature sensors disposed in correspondence to each one of the plurality of electro-thermal transducers, such that the plurality of electro-thermal transducers and the plurality of temperature sensors are segmented into a plurality of groups;
   a constant current source provided in each group, configured to apply a bias current to a plurality of temperature sensors in common for each group; and
   a voltage output circuit having a first switching element for turning electric current supply from the constant current source to each temperature sensor ON and OFF on the block-by-block basis, and a second switching element for obtaining a voltage generated at both terminals of the temperature sensor by the electric current supply to the temperature sensor regulated by the first switching element.

2. The recording head according to claim 1, further comprising an amplifier circuit configured to amplify the voltage obtained by the voltage output circuit.

3. The recording head according to claim 2, further comprising:
   a hold circuit configured to hold a detection voltage amplified by the amplifier circuit; and
   a difference amplifier circuit configured to amplify and output a difference between the voltage held in the hold circuit and a detection voltage of subsequent detection timing data amplified by the amplifier circuit.

4. The recording head according to claim 2, further comprising:
   a voltage generator circuit configured to generate a voltage corresponding to a predetermined temperature; and
   a difference amplifier circuit configured to amplify and output a difference between the voltage generated by the voltage generation circuit and the voltage amplified by the amplifier circuit.

5. The recording head according to claim 2, further comprising:
   a voltage generator circuit configured to generate a reference voltage corresponding to a reference temperature; and
   a difference amplifier circuit configured to amplify a difference between the reference voltage and the detection voltage.

6. The recording head according to claim 1, wherein the second switching element is provided in correspondence to each of the groups.

7. The recording head according to claim 6, wherein each respectively, the same number of electro-thermal transducers and temperature sensors.

8. The recording head according to claim 1, wherein the second switching element is provided in correspondence to each temperature sensor.

9. The recording head according to claim 1, further comprising:
   a serial register configured to accept as input and hold serial data, including recording data used for heating each transducer of the plurality of electro-thermal transducers, block selection data used for selecting a group of the temperature sensor and a blocks of the plurality of electro-thermal transducers, and sensor selection data used for selecting the temperature sensor whose voltage is obtained by the voltage output circuit, and
   a decoder unit configured to decode the block selection data and the sensor selection data and generate signals selecting the block, the group of temperature sensors, and the temperature sensor.

10. The recording head according to claim 1, wherein the temperature sensors are disposed substantially underneath the respective corresponding electro-thermal transducers, with an insulating layer interposed therebetween.

11. The recording head according to claim 1, further comprising:
   a plurality of amplifiers configured to amplify the detection voltages of the temperature sensors obtained by the voltage output circuit with corresponding offset voltages; and
   a selection circuit configured to select an output of the plurality of amplifiers.

12. The recording head according to claim 1, wherein the switching of the first and second switching elements is carried out using data inputted to a shift register.

13. The recording head according to claim 1, wherein the temperature sensors are respectively disposed directly underneath the electro-thermal transducers and the first and second switching elements are disposed in the vicinity of the temperature sensor.

14. A recording apparatus comprising:
- a recording head for discharging a liquid from discharge orifices by applying thermal energy from electro-thermal transducers to the liquid, the recording head comprising;
- a driving unit configured to drive by dividing a plurality of electro-thermal transducers into a plurality of blocks and supplying electric current on a block-by-block basis based on recording data;
- each of a plurality of temperature sensors disposed in correspondence to each one of the plurality of electro-thermal transducers, such that the plurality of electro-thermal transducers and the plurality of temperature sensors are segmented into a plurality of groups;
- a constant current source provided in each group, configured to apply a bias current to a plurality of temperature sensors in common for each group; and
- a voltage output circuit having a first switching element for turning electric current supply from the constant current source to each temperature sensor ON and OFF on the block-by-block basis, and a second switching element for obtaining a voltage generated at both terminals of the temperature sensor by the electric current supply to the temperature sensor regulated by the first switching element; and
- a transfer unit configured to transfer serial data to the recording head, the serial data including image data used for heating of each transducer of the plurality of electro-thermal transducers, block selection data used for selecting a group of the temperature sensors and a block of the plurality of electro-thermal transducers, and sensor selection data used for selecting the temperature sensor whose voltage is obtained by the voltage output circuit;
- a driving control unit configured to output signals used for heating the electro-thermal transducers of the recording head; and
- a temperature detection unit configured to detect a temperature by accepting an output of an amplifier circuit as input in synchronization with the heating carried out by the driving control unit.

15. The recording apparatus according to claim 14, wherein the temperature sensor select data is data relating to the detection of temperatures accompanying the heating of the electro-thermal transducers energized and driven in a first block during the driving of a second block different from the first block of the electro-thermal transducers driven by the driving control unit.

* * * * *